United States Patent
Kumar et al.

(10) Patent No.: US 11,818,772 B2
(45) Date of Patent: Nov. 14, 2023

(54) STATIC CONFIGURATION FOR PROCESSING A MESSAGE IN A TWO-STEP RANDOM ACCESS PROCEDURE IN AN OPEN RADIO ACCESS NETWORK

(71) Applicant: QUALCOMM Incorporated, San Diego, CA (US)

(72) Inventors: Satish Kumar, Hyderabad (IN); Tushar Singh, Hyderabad (IN); Sarath Pinayour Chandrasekaran, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 17/512,429

(22) Filed: Oct. 27, 2021

(65) Prior Publication Data
US 2023/0128512 A1    Apr. 27, 2023

(51) Int. Cl.
*H04W 74/08*       (2009.01)
*H04L 5/00*        (2006.01)
*H04W 72/0446*     (2023.01)
*H04W 72/0453*     (2023.01)

(52) U.S. Cl.
CPC ....... *H04W 74/0841* (2013.01); *H04L 5/0012* (2013.01); *H04L 5/0051* (2013.01); *H04W 72/0446* (2013.01); *H04W 72/0453* (2013.01); *H04W 74/0866* (2013.01)

(58) Field of Classification Search
CPC ......... H04W 74/0841; H04W 72/0446; H04W 72/0453; H04W 74/0866; H04W 74/0833; H04W 74/0808; H04W 88/085; H04W 72/04; H04L 5/0012; H04L 5/0051
See application file for complete search history.

(56) References Cited

FOREIGN PATENT DOCUMENTS

| WO | 2021204087 A1 | 10/2021 | |
| WO | WO-2022260459 A1 * | 12/2022 | ........... H04L 5/0048 |

OTHER PUBLICATIONS

International Search Report and Written Opinion—PCT/US2022/044699—ISA/EPO—dated Dec. 14, 2022.
O-RAN Alliance: "O-RAN Alliance Working Group 4, Management Plane Specification", O-RAN.WG4.MP.0-v05.00, Technical Specification, Feb. 28, 2021, pp. 1-202, XP055959009, Section 12.6.1, p. 121-p. 125.

\* cited by examiner

*Primary Examiner* — Thai Nguyen
(74) *Attorney, Agent, or Firm* — Loza & Loza, LLP

(57) ABSTRACT

An open radio access network (O-RAN) may include a control unit that communicates with a core network, a distributed unit that communicates with the control unit, a radio unit that communicates with the distributed unit and a user equipment (UE). Currently, the O-RAN may lack support for static configuration for a physical uplink shared channel (PUSCH) communication of message-A in a third generation partnership project (3GPP) two-step random access procedure. Hence, according to some aspects of the disclosure, the distributed unit may receive, from a radio unit, a static configuration support indication for receiving payload data via a message in a two-step random access procedure, the message including a preamble and the payload data. The distributed unit may further transmit, in response to receiving the static configuration support indication, static configuration information to the radio unit, the static configuration information for receiving the payload data communicated via the message.

30 Claims, 25 Drawing Sheets

800

```
1100
  +--rw static-msgA-pusch-configurations* [static-msgA-pusch-config-id] {mcap:MSGA-PUSCH-STATIC-CONFIGURATION-SUPPORTED}?
     +--rw static-msgA-pusch-config-id uint8
     +--rw nrofslotsmsgA-pusch uint8
     +--rw nrofmsgA-po-perslot uint8
     +--rw msgA-intraslotfrequencyhopping uint8
     +--rw msgA-pusch-tdm-occasion-parameters* [msgA-pusch-tdm-occasion-id]
        +--rw msgA-pusch-tdm-occasion-id uint8
        +--rw msgA-pusch-timedomainallocation uint16
        +--rw startsymbolandlengthmsgA-po uint16
        +--rw msgA-pusch-timedomainoffset uint16
        +--rw nrmsgA-po-fdm uint8
        +--rw guardbandmsgA-pusch uint16
        +--rw msgA-pusch-fdm-occasion-parameters* [msgA-pusch-fdm-occasion-id]
           +--rw msgA-pusch-fdm-occasion-id uint8
           +--rw frequencystartmsgA-pusch uint16
           +--rw nrofprb-permsgA-po uint16
        +--rw msgA-dmrs-timeposition uint16
        +--rw msgA-dmrs-frequencyposition uint16
        +--rw msgA-nondmrs-frequencyposition uint8
```

FIG. 11

```
module: o-ran-module-cap
  +--rw module-capability
     +--ro ru-capabilities
        +--ro band-capabilities* [band-number]
           +--ro max-num-carriers-dl? uint32
              +--txDirectCurrentLocationCarrier_0 uint16, ... -txDirectCurrentLocationCarrier_(max-num-carriers-dl -1) uint16
```

1200

```
                            ┌─────┐
                            │  B  │
                            └──┬──┘
                               ▼
┌───────────────────────────────────────────────────────────────┐
│ Receive a resource overlap indicator from the distributed unit,│
│ wherein the resource overlap indicator indicates one or more  │──2352
│ uplink resources allocated for at least a portion of the payload
│ data and for a different data, different from the payload data│
└───────────────────────────────┬───────────────────────────────┘
                                ▼
┌───────────────────────────────────────────────────────────────┐
│ Receive, from the distributed unit, an enable indicator that  │
│ indicates whether to transmit the quadrature data corresponding│──2354
│ to the one or more uplink resources to the distributed unit   │
│ based on the resource overlap indicator                       │
└───────────────────────────────┬───────────────────────────────┘
                                ▼
┌───────────────────────────────────────────────────────────────┐
│ Refrain from transmitting, to the distributed unit, quadrature │──2356
│ data corresponding to the one or more uplink resources         │
└───────────────────────────────┬───────────────────────────────┘
                                ▼
┌───────────────────────────────────────────────────────────────┐
│ Transmit a direct current (DC) subcarrier location to the     │
│ distributed unit, the DC subcarrier location indicating a     │──2358
│ location of a DC subcarrier used to communicate with a user   │
│ equipment (UE)                                                │
└───────────────────────────────┬───────────────────────────────┘
                                ▼
┌───────────────────────────────────────────────────────────────┐
│ Receive downlink data that carries a system information block │──2360
│ including the DC subcarrier location from the distributed unit│
└───────────────────────────────┬───────────────────────────────┘
                                ▼
┌───────────────────────────────────────────────────────────────┐
│              Transmit the downlink data to the UE             │──2362
└───────────────────────────────┬───────────────────────────────┘
                                ▼
                            ┌─────┐
                            │ End │
                            └─────┘
```

FIG. 23C

STATIC CONFIGURATION FOR PROCESSING A MESSAGE IN A TWO-STEP RANDOM ACCESS PROCEDURE IN AN OPEN RADIO ACCESS NETWORK

TECHNICAL FIELD

The technology discussed below relates generally to wireless communication systems, and more particularly, to a configuration for processing a payload of a message in a two-step random access procedure in an open radio access network (O-RAN).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station via the downlink and uplink. The downlink (or forward link) refers to the communication link from the base station to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A two-step random access procedure may be used in an open radio access network (O-RAN, for example, such as defined by the O-RAN ALLIANCE in the corresponding O-RAN specification), where the first step is transmitting, by a user equipment (UE), a message A (msgA) including a preamble (e.g., physical random access channel (PRACH) data) and a payload (e.g., physical uplink shared channel (PUSCH) data), and the second step is receiving, by the UE, a message B that may include a random access response and a contention resolution message. In the current O-RAN specification, a distributed unit (DU) may communicate to a radio unit (RU) to statically configure a PRACH transmission of the message A. However, currently, the O-RAN specification lacks support for a static configuration of a PUSCH transmission of the message A. Hence, according to some aspects of the disclosure, when a DU receives a static configuration support indication for receiving a payload of a message A of a two-step random access procedure, the DU may transmit static configuration information to the RU, such that the RU may statically configure the RU for receiving the payload communicated via the message A.

In one example, a method of wireless communication by a distributed unit is disclosed. The method includes receiving, from a radio unit, a static configuration support indication for receiving payload data via a message in a two-step random access procedure, the message including a preamble and the payload data, and transmitting, in response to receiving the static configuration support indication, static configuration information to the radio unit, the static configuration information for receiving the payload data communicated via the message.

In another example, a distributed unit for wireless communication is disclosed. The distributed unit includes at least one processor, a transceiver communicatively coupled to the at least one processor, and a memory communicatively coupled to the at least one processor. The at least one processor may be configured to: receive, from a radio unit, a static configuration support indication for receiving payload data via a message in a two-step random access procedure, the message including a preamble and the payload data, and transmit, in response to receiving the static configuration support indication, static configuration information to the radio unit, the static configuration information for receiving the payload data communicated via the message.

In another example, a non-transitory processor-readable storage medium having instructions for a distributed unit thereon may be disclosed. The instructions, when executed by a processing circuit, cause the processing circuit to: receive, from a radio unit, a static configuration support indication for receiving payload data via a message in a two-step random access procedure, the message including a preamble and the payload data, and transmit, in response to receiving the static configuration support indication, static configuration information to the radio unit, the static configuration information for receiving the payload data communicated via the message.

In a further example, a distributed unit for wireless communication may be disclosed. The distributed unit includes means for receiving, from a radio unit, a static configuration support indication for receiving payload data via a message in a two-step random access procedure, the message including a preamble and the payload data, and means for transmitting, in response to receiving the static configuration support indication, static configuration information to the radio unit, the static configuration information for receiving the payload data communicated via the message.

In one example, a method of wireless communication by a radio unit is disclosed. The method includes transmitting, to a distributed unit, a static configuration support indication for receiving payload data via a message in a two-step random access procedure, the message including a preamble and the payload data, and receiving, in response to the static configuration support indication, static configuration information from the distributed unit, the static configuration information for receiving the payload data communicated via the message.

In another example, a radio unit for wireless communication is disclosed. The radio unit includes at least one processor, a transceiver communicatively coupled to the at least one processor, and a memory communicatively coupled to the at least one processor. The at least one processor may be configured to: transmit, to a distributed unit, a static configuration support indication for receiving payload data via a message in a two-step random access procedure, the message including a preamble and the payload data, and receive, in response to the static configuration support indication, static configuration information from the distributed unit, the static configuration information for receiving the payload data communicated via the message.

In another example, a non-transitory processor-readable storage medium having instructions for a radio unit thereon may be disclosed. The instructions, when executed by a processing circuit, cause the processing circuit to: transmit, to a distributed unit, a static configuration support indication for receiving payload data via a message in a two-step random access procedure, the message including a preamble and the payload data, and receive, in response to the static configuration support indication, static configuration information from the distributed unit, the static configuration information for receiving the payload data communicated via the message.

In a further example, a radio unit for wireless communication may be disclosed. The radio unit includes means for transmitting, to a distributed unit, a static configuration support indication for receiving payload data via a message in a two-step random access procedure, the message including a preamble and the payload data, and means for receiving, in response to the static configuration support indication, static configuration information from the distributed unit, the static configuration information for receiving the payload data communicated via the message.

These and other aspects of the disclosure will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein.

In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 11 is an example diagram illustrating a Yang module for static configuration information for receiving PUSCH data communicated via a message A of the two-step random access procedure, according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
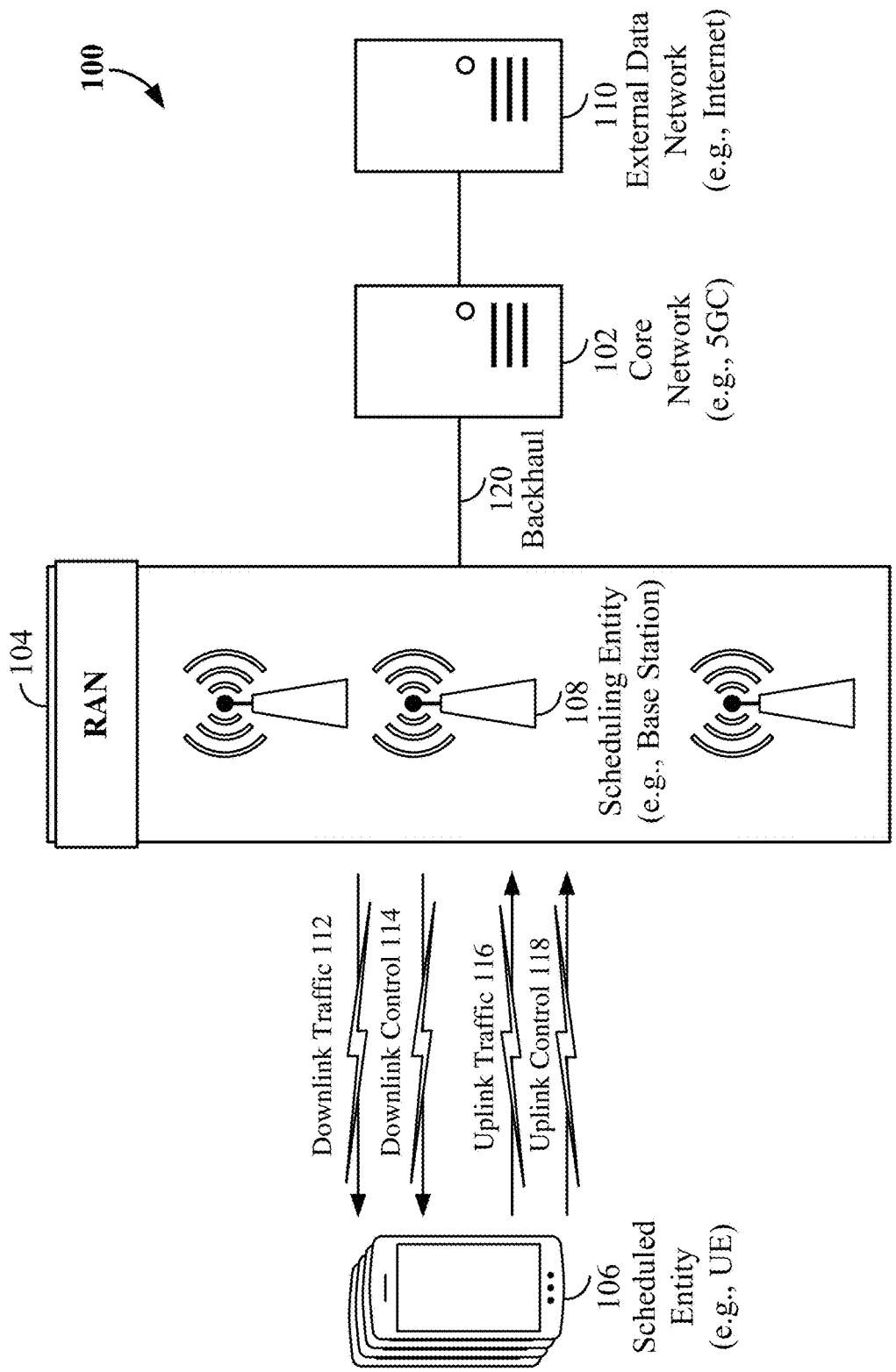
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP) or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; vehicles, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
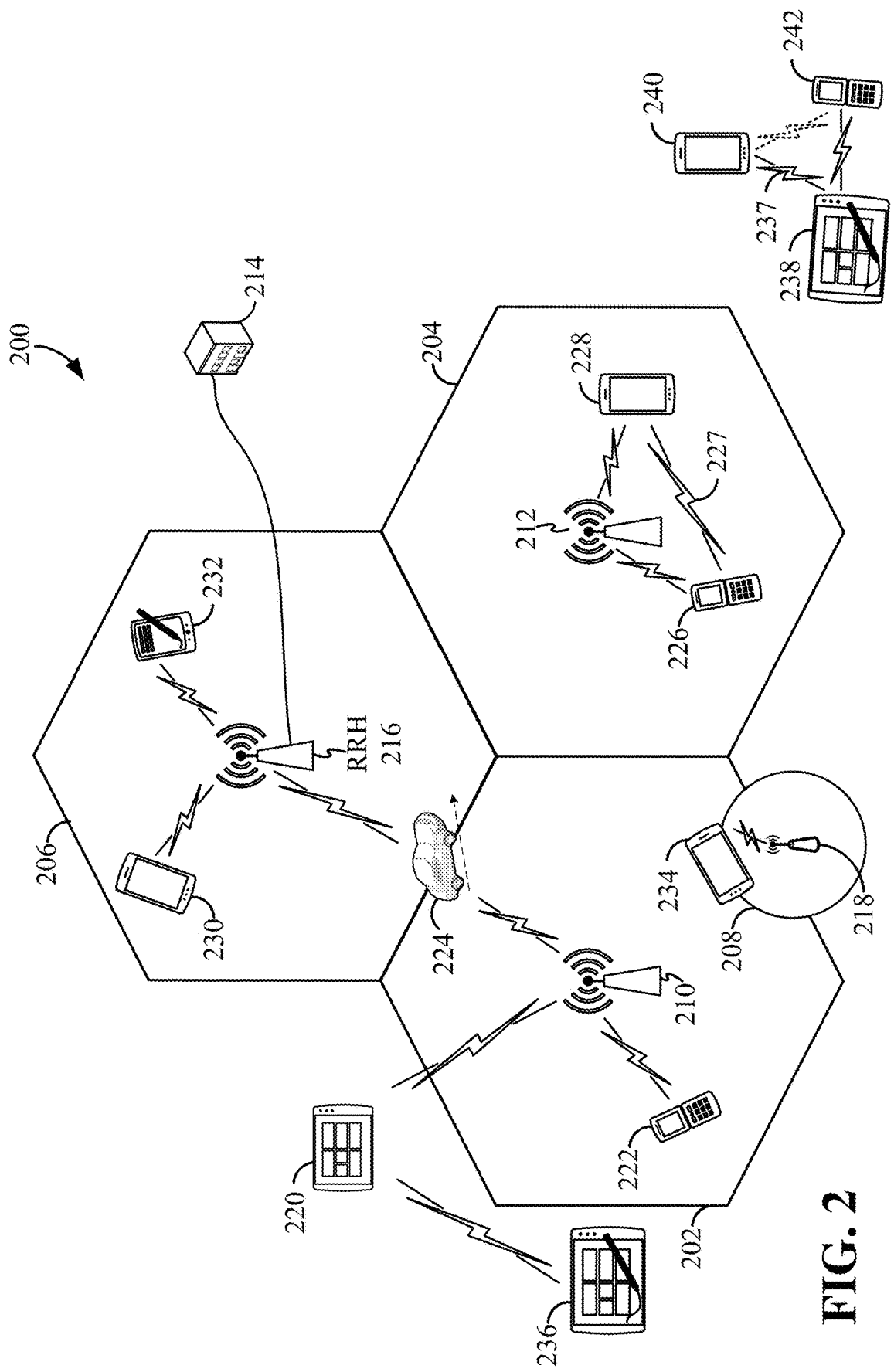
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a mobile device 220, which may be configured to function as a base station. That is, in some examples, a cell may not necessarily be stationary, and the geographic area of the cell may move according to the location of a mobile base station such as the mobile device 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., mobile device 220) may be configured to function as a UE. For example, the mobile device 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Figure 3:
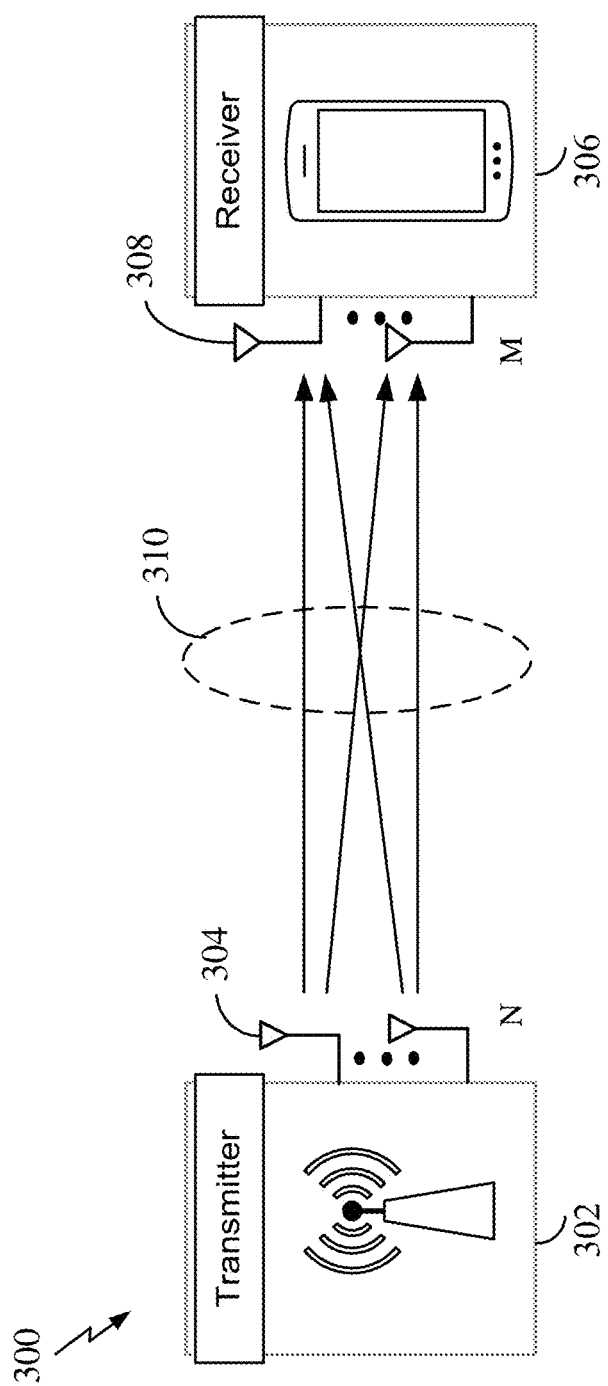
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
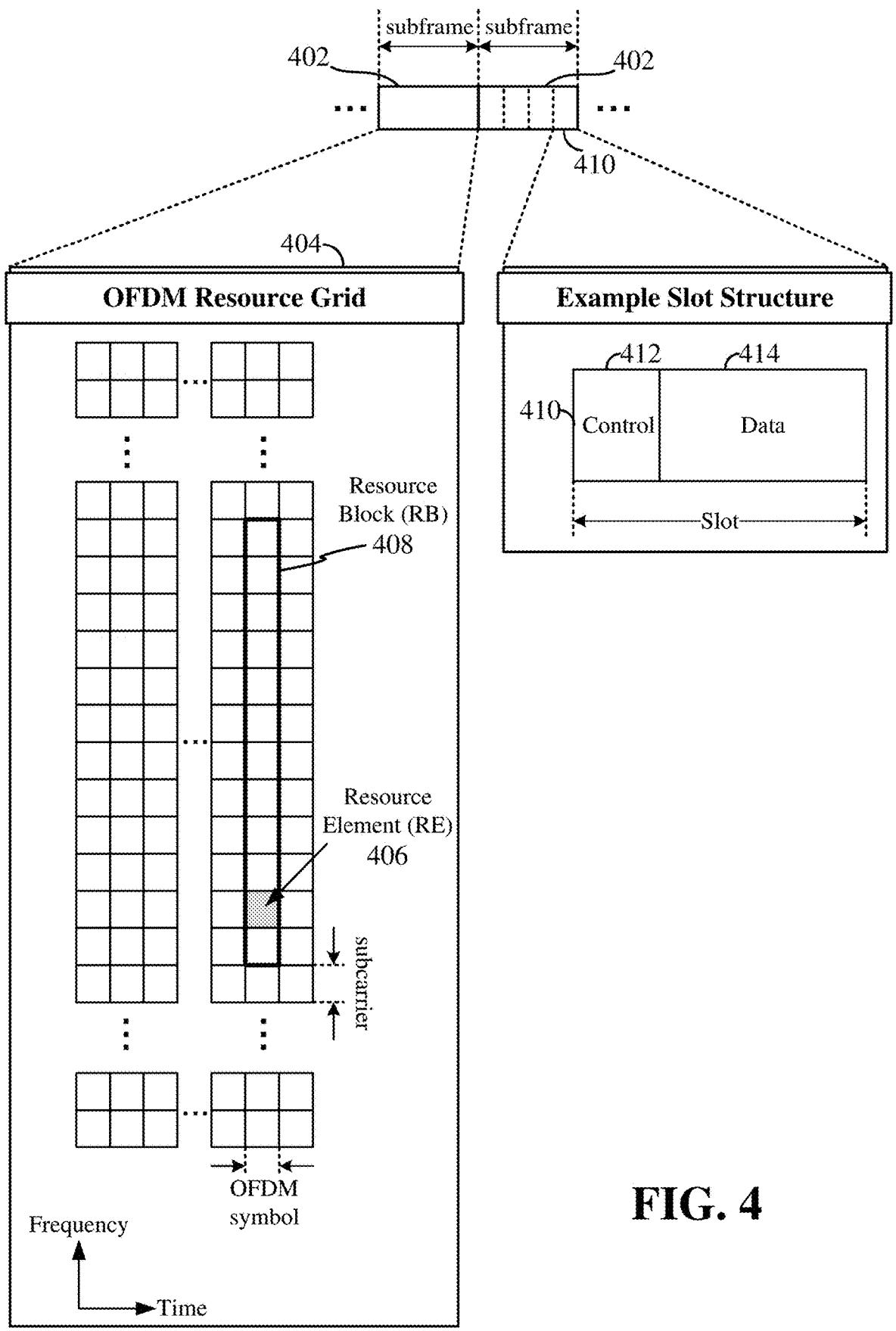
FIG. 4 is a schematic illustration of an organization of wireless resources in an air interface utilizing orthogonal frequency divisional multiplexing (OFDM) according to some embodiments.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

For random access processes in NR, at least two types of random access procedures for random access channel (RACH) processes exist, including a four-step random access procedure and a 2-step random access procedure. For example, the four-step random access procedure includes communication of four messages, including a first message (e.g., msg1), a second message (e.g., msg2), a third message (e.g., msg3), and a fourth message (e.g., msg4). The first message is a UL message that may include a preamble, and the second message is a DL message that may include a random access response. The third message is a UL message that may include a PUSCH message, and the fourth message is a DL communication that may include a contention resolution message.

Figure 5:
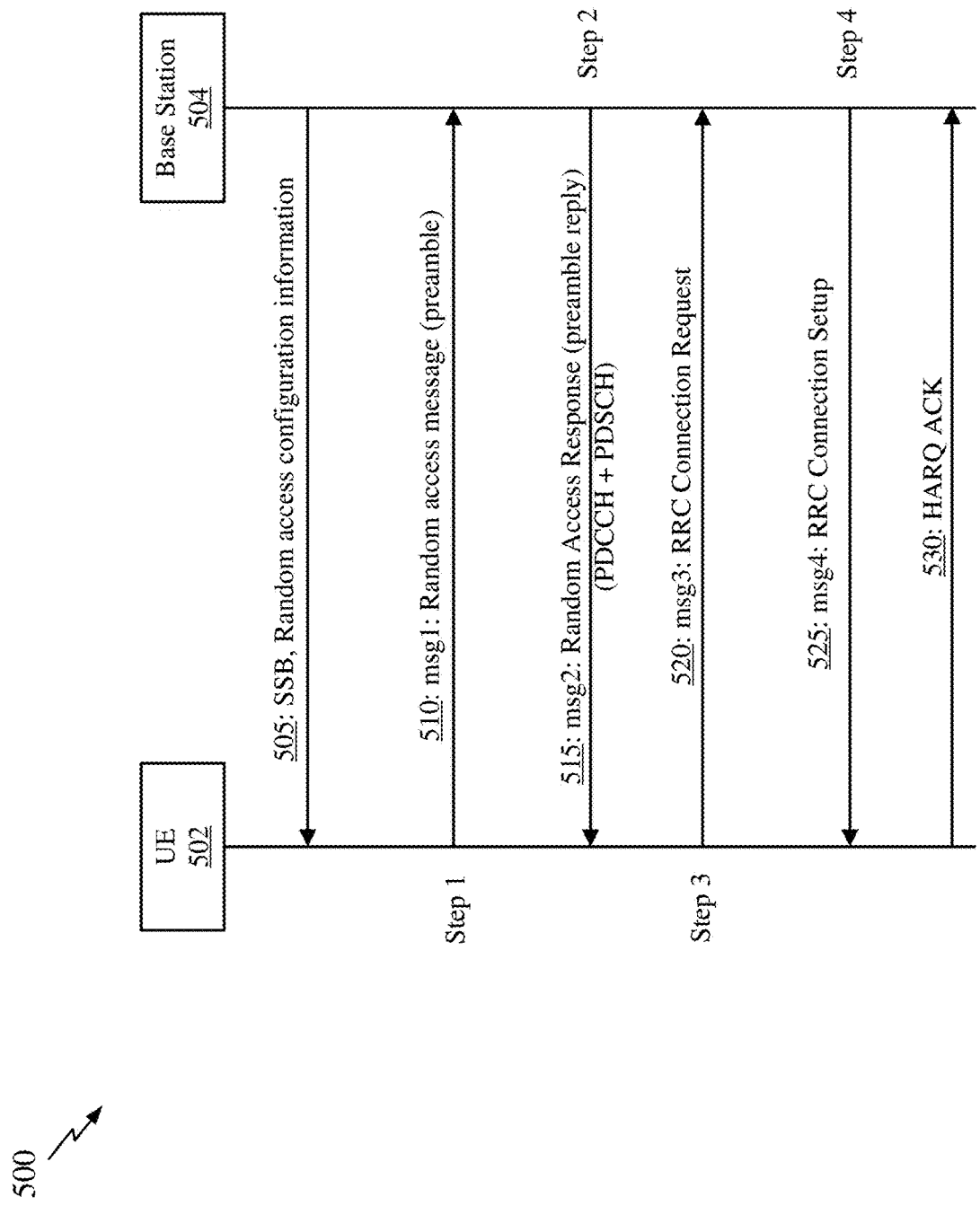
FIG. 5 is an example diagram illustrating an example of a four-step random access procedure, according to some aspects.

FIG. 5 is an example diagram illustrating an example 500 of a four-step random access procedure, according to some aspects. FIG. 5 is provided as an example, and other examples may differ from what is described with regard to FIG. 5. As shown in FIG. 5, a UE 502 and a base station 504 may communicate with one another to perform the four-step random access procedure. The UE 502 may be a UE or a scheduled entity, such as the scheduled entity 106 of FIG. 1, and the base station 504 may be a base station or a scheduling entity, such as the scheduling entity 108 of FIG. 1.

As shown by reference number 505, the base station 504 may transmit, and the UE 502 may receive, one or more SSBs and random access configuration information. In some aspects, the random access configuration information may be transmitted in and/or indicated by system information (e.g., in one or more SIBs and/or the like) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a random access message, one or more parameters for receiving a random access response, and/or the like.

As a first step (step 1) of the four-step random access procedure, the UE 502 may transmit a first message 510, which may include a preamble (sometimes referred to as a random access preamble, a PRACH preamble, a random access message preamble, and/or the like). The first message 510 that includes the preamble may be referred to as a message 1, msg1, MSG1, an initial message, a random access message, and/or the like in a four-step random access procedure. The first message 510 may include a random access preamble identifier.

As a second step (step 2) of the four-step random access procedure, the base station 504 may transmit a second message 515 as a reply to the preamble received via the first message 510. The second message 515 may include a random access response. The second message 515 may be referred to as message 2, msg2, MSG2, or a random access response message, in a four-step random access procedure. In some aspects, the second message 515 may indicate the detected random access preamble identifier (e.g., received from the UE 502 in msg1). Additionally, or alternatively, the second message 515 may indicate a resource allocation to be used by the UE 502 to transmit message 3 (msg3).

In some aspects, as a part of the transmission of the second message 515 in the second step, the base station 504 may transmit a PDCCH communication for the random access response. The PDCCH communication may schedule a PDSCH communication that includes the random access response. For example, the PDCCH communication may indicate a resource allocation for the PDSCH communication. Also as a part of the transmission of the second message 515 in the second step, the base station 504 may transmit the PDSCH communication for the random access response, as scheduled by the PDCCH communication. The random access response may be included in a MAC PDU of the PDSCH communication. In some aspects, as a part of the transmission of the second message 515 in the second step, the base station 504 may transmit a timing advance and/or a UL grant, for uplink communication.

As a third step (step 3) of the four-step random access procedure, the UE 502 may transmit a third message 520. The third message 520 may be referred to as message 3, msg3, MSG3, an RRC connection request message, or a scheduled transmission message of a four-step random access procedure. In some aspects, the third message 520 may include a UE identifier, UCI, a PUSCH communication (e.g., an RRC connection request), and/or the like.

As a fourth step (step 4) of the four-step random access procedure, the base station 504 may transmit a fourth message 525. The RRC connection setup message may be referred to as message 4, msg4, MSG4, an RRC connection setup message, or a contention resolution message of a four-step random access procedure. In some aspects, the fourth message 525 may include the detected UE identifier, a timing advance value, contention resolution information, and/or the like. As shown by reference number 530, if the UE 502 successfully receives the RRC connection setup message/contention resolution message, the UE 502 may transmit a HARQ ACK.

The two-step random access procedure may include communication of two messages, a message A (e.g., msgA) and a message B (e.g., msgB). The message A includes a preamble portion and a pay load portion. In an example, in the message A, the preamble portion may be equivalent to the first message of the four-step random access procedure and the payload portion may be equivalent to the third message of the four-step random access procedure. Hence, the message A may be considered as a combination of the first message and the third message from the four-step random access procedure. The message B may include information carried by the second message and the fourth message of the four-step random access procedure.

The two-step random access procedure may provide at least the following advantages over the four-step random access procedure. The two-step random access procedure may reduce the latency and signaling overhead associated with the four-step random access procedure, as the number of messages exchanged during the two-step random access procedure is less than the number of messages exchanged during the four-step random access procedure. Further, the two-step random access procedure may allow small UL packet transmissions that may not require timing advance (TA) or a grant. The two-step random access procedure may improve the capacity and power efficiency when compared to the contention based random access (CBRA) of the four-step random access procedure. In addition, because the two-step random access procedure may improve the overall latency of a random-access procedure and power consumption, the two-step random access procedure may be reliably used for an ultra-reliable low latency communication (URLLC) whose reliability depends on latency and for a massive machine type communication (mMTC) that may be power dependent.

Figure 6:
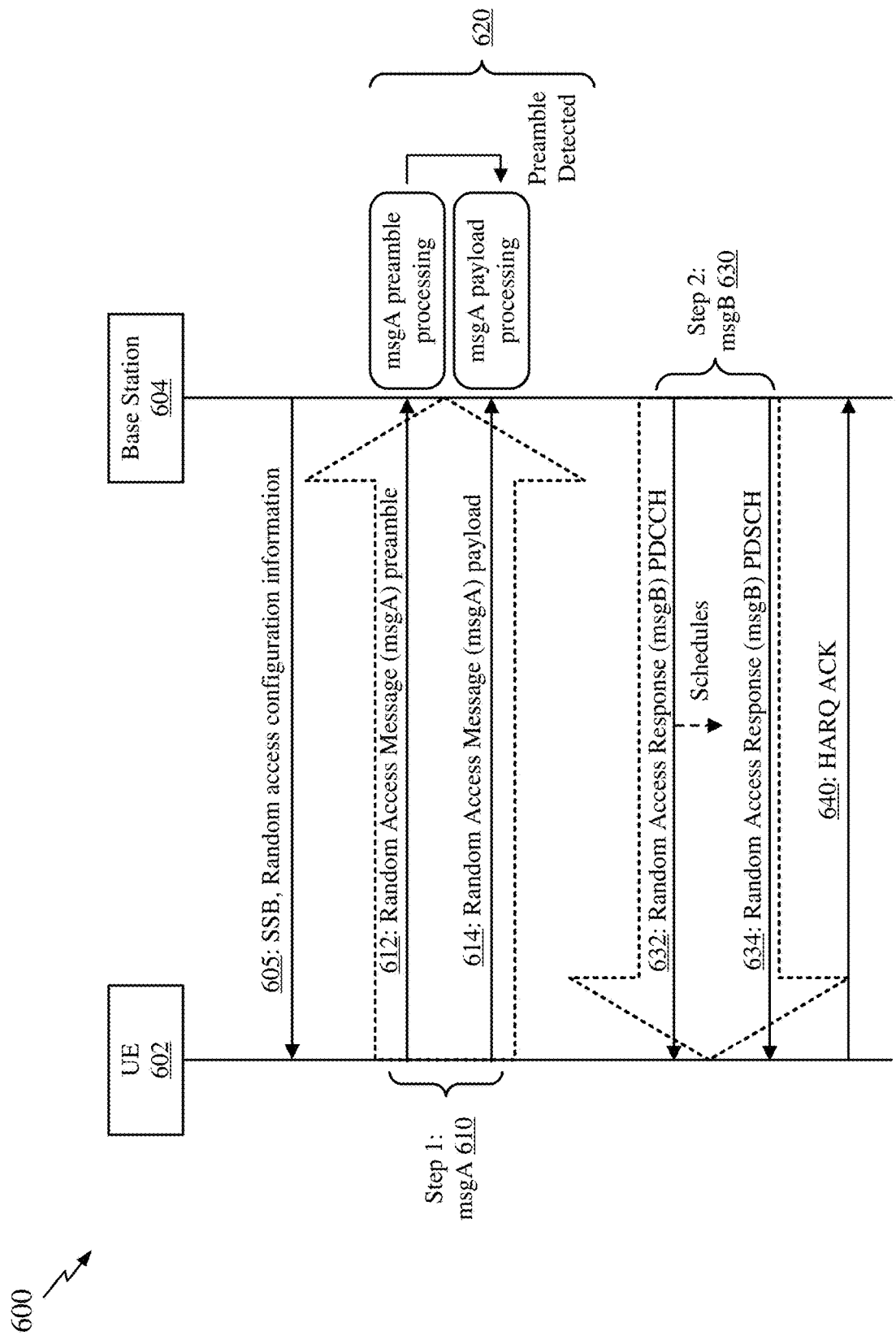
FIG. 6 is an example diagram illustrating an example of a two-step random access procedure, according to some aspects.

FIG. 6 is an example diagram illustrating an example 600 of a two-step random access procedure, according to some aspects. FIG. 6 is provided as an example, and other examples may differ from what is described with regard to FIG. 6. As shown in FIG. 6, a UE 602 and a base station 604 may communicate with one another to perform the two-step random access procedure. The UE 602 may be a UE or a scheduled entity, such as the scheduled entity 106 of FIG. 1, and the base station 604 may be a base station or a scheduling entity, such as the scheduling entity 108 of FIG. 1.

As shown by reference number 605, the base station 604 may transmit, and the UE 602 may receive, one or more SSBs and random access configuration information. In some aspects, the random access configuration information may be transmitted in and/or indicated by system information (e.g., in one or more SIBs and/or the like) and/or an SSB, such as for contention-based random access. Additionally, or alternatively, the random access configuration information may be transmitted in a radio resource control (RRC) message and/or a physical downlink control channel (PDCCH) order message that triggers a random access channel (RACH) procedure, such as for contention-free random access. The random access configuration information may include one or more parameters to be used in the two-step random access procedure, such as one or more parameters for transmitting a random access message, receiving a random access response to the random access message, and/or the like.

As a first step (step 1) of the two-step random access procedure, the UE 602 may transmit a message A 610 to the base station 604. As a part of the first step of the two-step random access procedure, the UE 602 may transmit, and the base station 604 may receive, a preamble 612 of the message A 610. Further, as a part of the first step of the two-step random access procedure, the UE 602 may also transmit, and the base station 604 may receive, a payload 614 of the message A 610. As shown, the UE 602 may transmit the preamble 612 and the payload 614 to the base station 604 as part of the first step of the two-step random access procedure. In some aspects, the message A 610 may be referred to as msgA, an initial message, a random access message, a first message, and/or the like in a two-step random access procedure. Furthermore, in some aspects, the preamble 612 may be referred to as a message A preamble, a msgA preamble, a preamble, a physical random access channel (PRACH) preamble, and/or the like, and the payload 614 may be referred to as a message A payload, a msgA payload, a payload, and/or the like. In some aspects, the message A 610 may include some or all of the contents of message 1 (msg1) and message 3 (msg3) of a four-step random access procedure, which is described in more detail above. For example, the preamble 612 may include some or all contents of message 1 (e.g., a PRACH preamble), and the payload

614 may include some or all contents of message 3 (e.g., a UE identifier, UCI, a PUSCH transmission, and/or the like).

In some aspects, as shown by reference number 620, the base station 604 may receive the preamble 612 transmitted by the UE 602. If the base station 604 successfully receives and decodes the preamble 612, the base station 604 may then receive and decode the payload 614.

In response to successfully receiving and decoding the preamble 612 and the payload 614 of the message A 610, as a second step (step2) of the two-step random access procedure, the base station 604 may transmit a message B 630 to the UE 602. In some aspects, the message B 630 may be referred to as msgB, a random access response message, or a second message in a two-step random access procedure. The message B 630 may include some or all of the contents of message 2 (msg2) and message 6 (msg4) of a four-step random access procedure. For example, the message B 630 may include the detected PRACH preamble identifier, the detected UE identifier, a timing advance value, contention resolution information, and/or the like.

As a part of the second step of the two-step random access procedure, the base station 604 may transmit a PDCCH communication 632 for the random access response. The PDCCH communication may schedule a physical downlink shared channel (PDSCH) communication, such as the PDSCH communication 634. For example, the PDCCH communication may indicate a resource allocation (e.g., in downlink control information (DCI)) for the PDSCH communication.

As part of the second step of the two-step random access procedure, the base station 604 may also transmit the PDSCH communication 634 for the random access response, as scheduled by the PDCCH communication 632. As shown by reference number 640, if the UE 602 successfully receives the message B 630, the UE 602 may transmit a HARQ acknowledgement (ACK).

Figure 7:
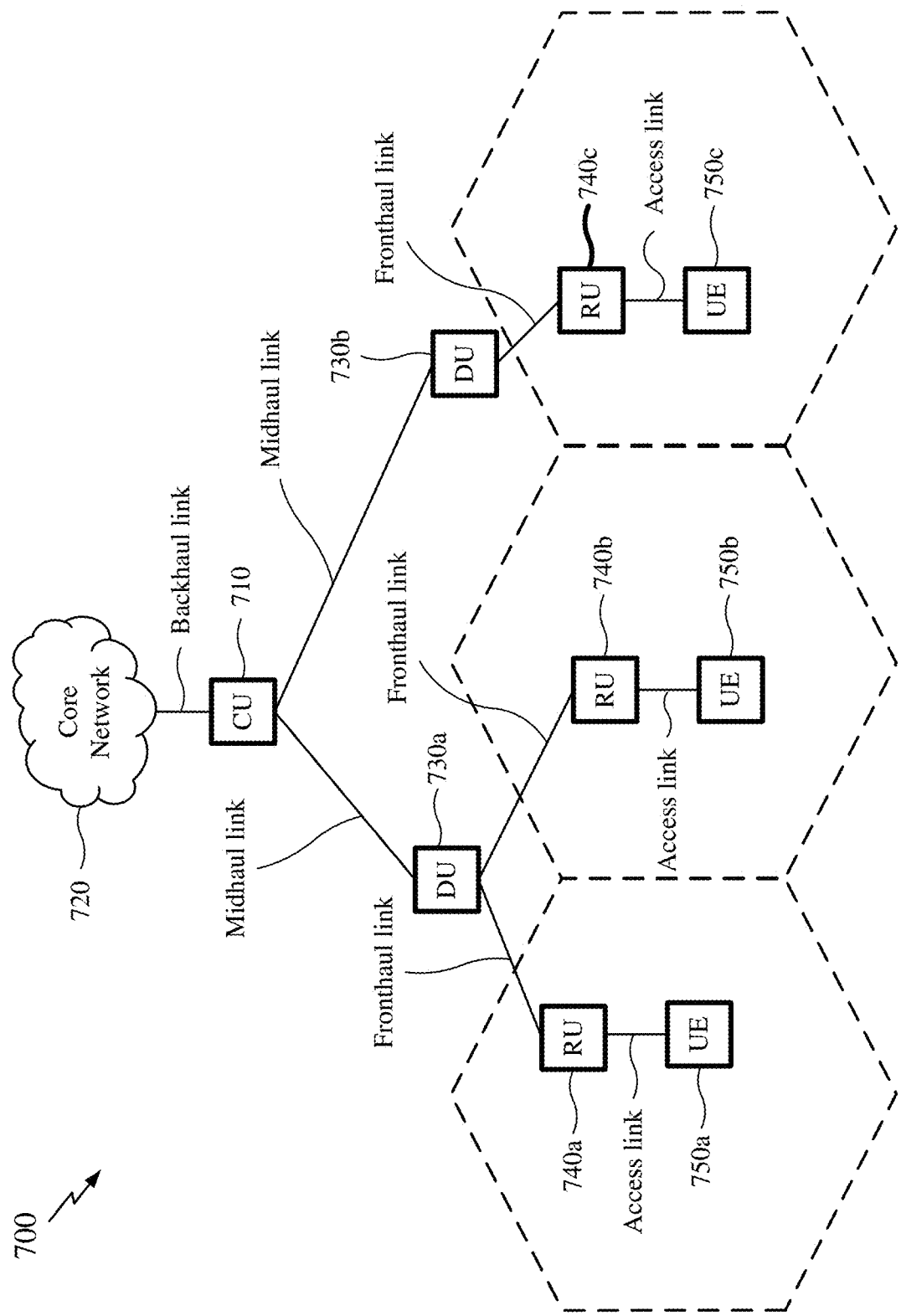
FIG. 7 is an example diagram illustrating an example of an open radio access network (O-RAN) architecture, according to some aspects.

FIG. 7 is an example diagram illustrating an example 700 of an open radio access network (O-RAN) architecture, according to some aspects. FIG. 7 is provided as an example, and other examples may differ from what is described with regard to FIG. 7. As shown in FIG. 7, the O-RAN architecture may include a control unit (CU) 710 that communicates with a core network 720 via a backhaul link. Furthermore, the CU 710 may communicate with one or more distributed units (DUs) 730*a*-730*b* via respective midhaul links. The DUs 730*a*-730*b* may each communicate with one or more of radio units (RUs) 740*a*-740*c* via respective fronthaul links, and the RUs 740*a*-740*c* may each communicate with respective UEs 750*a*-750*c* via radio frequency (RF) access links. The DUs 730*a*-730*b* may be collectively referred to as the DUs 730, the RUs 740*a*-740*c* may be collectively referred to as RUs 740, and the UEs 750*a*-750*c* may be collectively referred to as the UEs 750.

In some aspects, the DUs 730 and the RUs 740 may be implemented according to a functional split architecture in which functionality of a base station (e.g., an eNB or gNB) is provided by a DU 730 and one or more RUs 740 that communicate over a fronthaul link. Accordingly, as described herein, a base station 110 such as the scheduled entity 108 of FIG. 1 or the base station 640 of FIG. 6 may include a DU 730 and one or more RUs 740 that may be co-located or geographically distributed. In some aspects, the DU 730 and the associated RU(s) 740 may communicate via a fronthaul link to exchange real-time control plane information via a lower layer split (LLS) control plane (C-plane) interface, to exchange non-real-time management information via an LLS management plane (M-plane) interface, to exchange user plane information via an LLS user plane (U-plane) interface, and/or the like. A communication via a C-plane and a communication via a U-plane may be performed dynamically. A communication via an M-plane may be used for management purposes, and may be a static communication.

Accordingly, the DU 730 may correspond to a logical unit that includes one or more base station functions to control the operation of one or more RUs 740. For example, in some aspects, the DU 730 may host a radio link control (RLC) layer, a medium access control (MAC) layer, and one or more high physical (PHY) layers (e.g., forward error correction (FEC) encoding and decoding, scrambling, modulation and demodulation, and/or the like) based at least in part on a lower layer functional split. Higher layer control functions, such as a packet data convergence protocol (PDCP), radio resource control (RRC), service data adaptation protocol (SDAP), and/or the like, may be hosted by the CU 710. The RU(s) 740 controlled by a DU 730 may correspond to logical nodes that host RF processing functions and low-PHY layer functions (e.g., fast Fourier transform (FFT), inverse FFT (iFFT), digital beamforming, PRACH extraction and filtering, and/or the like) based at least in part on the lower layer functional split. Accordingly, in an O-RAN architecture, the RU(s) 740 handle all over the air (OTA) communication with a UE 120, and real-time and non-real-time aspects of control and user plane communication with the RU(s) 740 are controlled by the corresponding DU 730, which enables the DU(s) 730 and the CU 710 to be implemented in a cloud-based RAN architecture.

As described above, a transmission of a message A (msgA) in a two-step random access produce may include a transmission of a preamble and a transmission of a payload. For example, the preamble may include PRACH data and the payload may include PUSCH data. An O-RAN specification provides support for a static configuration of a PRACH transmission and an SRS transmission. For example, in the current O-RAN specification, a DU may communicate to an RU (e.g., via an M-plane), to statically configure a PRACH transmission and/or an SRS transmission, such that the configurations for the PRACH transmission and/or the SRS transmission may not change.

For a configuration of a PUSCH transmission, the O-RAN specification may provide a dynamic configuration via a C-plane from a DU to an RU. For example, configuration for a PUSCH transmission may be used for resource allocation known during an extended antenna-carrier (eAxC) activation. Because the PUSCH transmission by the RU is configured dynamically, a C-plane message may need to be communicated using the dynamic configuration for every communication. Therefore, the dynamic configuration using C-plane messages may be burdensome on the fronthaul between the DU and the RU. On the other hand, if a static configuration is implemented for all communications, then resources (e.g., bandwidth) for the fronthaul between the DU and the RU may be conserved. However, currently, the O-RAN specification lacks support for a static configuration of a PUSCH transmission as a part of the transmission of the message A.

According to some aspects of the disclosure, an RU may transmit, to a DU, a static configuration support indication for receiving payload data via a message A of the two-step random access procedure, and in response, the DU may transmit static configuration information to the RU, where the static configuration information is for statically configuring the RU for receiving the payload data communicated via the message A of the two-step random access procedure.

Hence, for example, if the RU supports the static configuration for receiving the payload data of the message A of the two-step random access procedure, the RU may transmit the static configuration support indication to indicate the RU's support for the static configuration for receiving the payload data of the message A. On the other hand, if the RU does not support the static configuration for receiving the payload data of the message A of the two-step random access procedure, the RU may not transmit (e.g., refrain from transmitting) the static configuration support indication. In an example, the static configuration support indication may be included in an O-RAN module. As discussed above, for example, the message A of the two-step random access procedure may be referred to as a msgA, and may include PRACH data as the preamble of the message A and PUSCH data as the payload data of the message A.

In an aspect, the static configuration support indication may be transmitted to the DU via an M-plane. Hence, an RU may send quadrature data to the DU without a C-plane communication to configure the RU, which may reduce the backhaul bandwidth by using an M-plane message instead of a C-plane message. For example, the static configuration information for receiving the payload data may be provided via an M-plane communication, and may be used as resource allocation for an eAxC activation.

Figure 8:
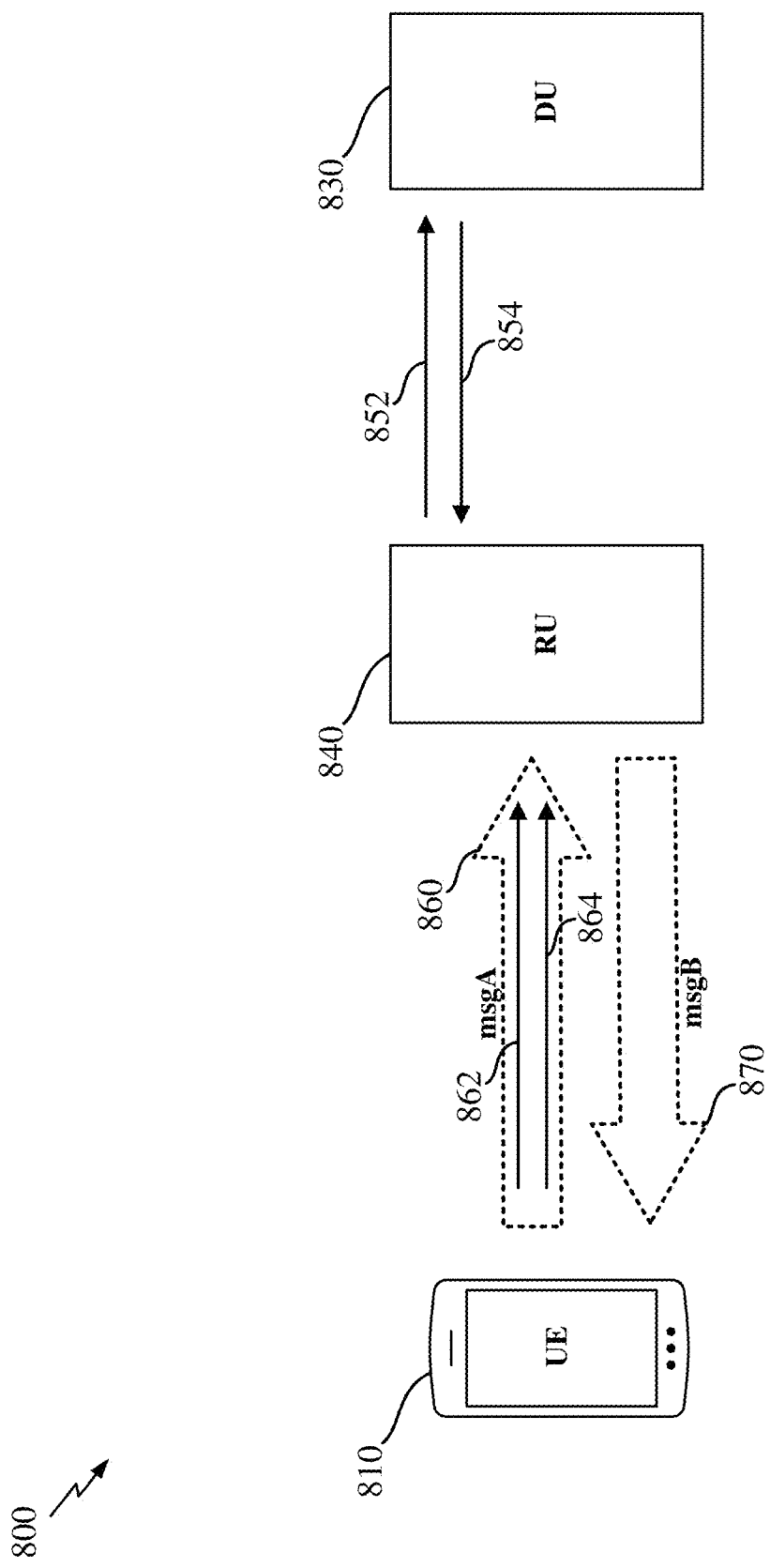
FIG. 8 is an example diagram illustrating features performed by a user equipment (UE), a radio unit (RU), and a distributed unit (DU) in an O-RAN, according to some aspects.

FIG. 8 is an example diagram 800 illustrating features performed by a UE, an RU, and a DU in an O-RAN, according to some aspects. In FIG. 8, a DU 830 may communicate with an RU 840, which may communicate with a UE 810. The DU 830 may be similar to the DU 730 of FIG. 7, the RU 840 may be similar to the RU 740 of FIG. 7, and the UE 810 may be similar to the scheduled entity/UE 106.

At 852, the RU 840 may transmit a static configuration support indication for receiving payload data via a message A in a two-step random access procedure. For example, the RU 840 may transmit the static configuration support indication if the RU 840 supports the static configuration for receiving the payload data of the message A. In response to receiving the static configuration support indication, at 854, the DU 830 may transmit static configuration information for receiving payload data communicated via the message A. When the RU 840 receives the static configuration information, the RU 840 may statically configure the RU for receiving the payload data of the message A based on the static configuration information. In an aspect, if the RU 840 determines to configure the RU based on the static configuration information, the RU 840 may configure the RU 840 based on the static configuration information so as to receive the payload data based on the static configuration information.

At 860 and at 870, the UE 810 and the RU 840 may perform the two-step random access procedure. At 860, the UE 810 may transmit a message A of the two-step random access procedure to the RU 840, where the transmission 860 of the message A may include a transmission 862 of a preamble and a transmission 864 of payload data. When the RU 840 receives the payload data at 864, the RU 840 may receive the payload data based on the static configuration information. After receiving the message A, at 870, the RU 840 may transmit, and the UE 810 may receive, a message B of the two-step random access procedure.

In an aspect, even if the RU indicates the static configuration support indication to the DU, the DU may not automatically provide the static configuration information for the static configuration for receiving the payload data of the message A to the RU. Instead, in this aspect, after receiving the static configuration support indication, the DU may determine whether to configure the RU with the static configuration or not, e.g., based on a network capability for supporting the static configuration. Hence, in this aspect, even when the RU supports the static configuration, the DU may still determine not to configure the RU with the static configuration and thus not transmit the static configuration information for the static configuration to the RU, e.g., if the DU determines that the network does not support the static configuration. On the other hand, if the DU determines to configure the RU with the static configuration, after receiving the static configuration support indication, the DU may transmit the static configuration information for the static configuration to the RU.

In an aspect, the static configuration information for the static configuration for receiving the payload data of the message A may include a frequency domain configuration for receiving the payload data, a time domain configuration for receiving the payload data, and/or a reference signal configuration.

In an aspect, the frequency domain configuration may include parameters, such as a number of frequency-multiplexed PUSCH occasions available per time instance, a number of resource blocks by which consecutive PUSCH occasions in a frequency domain are separated, an offset value with respect to a physical resource block (PRB) number zero or a virtual resource block (VRB) number zero, where the offset value indicates a starting PRB of a PUSCH occasion or a starting VRB of the PUSCH occasion, a number of PRBs per PUSCH occasion, and/or an indication indicating whether to perform frequency hopping for transmission of the message along with a hopping offset. For example, the number of frequency-multiplexed PUSCH occasions available per time instance may be represented by a parameter "nrmsgA-po-fdm", the number of resource blocks by which consecutive PUSCH occasions in a frequency domain are separated may be represented by a parameter "guardbandmsgA-pusch", and the offset value with respect to a PRB number zero or a VRB number zero may be represented by a parameter "frequencystartmsgA-pusch" that may indicate a starting PRB or a starting VRB of the PUSCH occasion. Further, for example, the number of PRBs per PUSCH occasion may be represented by a parameter "nrofprb-permsgA-po", and the indication indicating whether to perform frequency hopping for transmission of the message along with a hopping offset may be represented by "msgA-intraslotfrequencyhopping."

Figure 9:
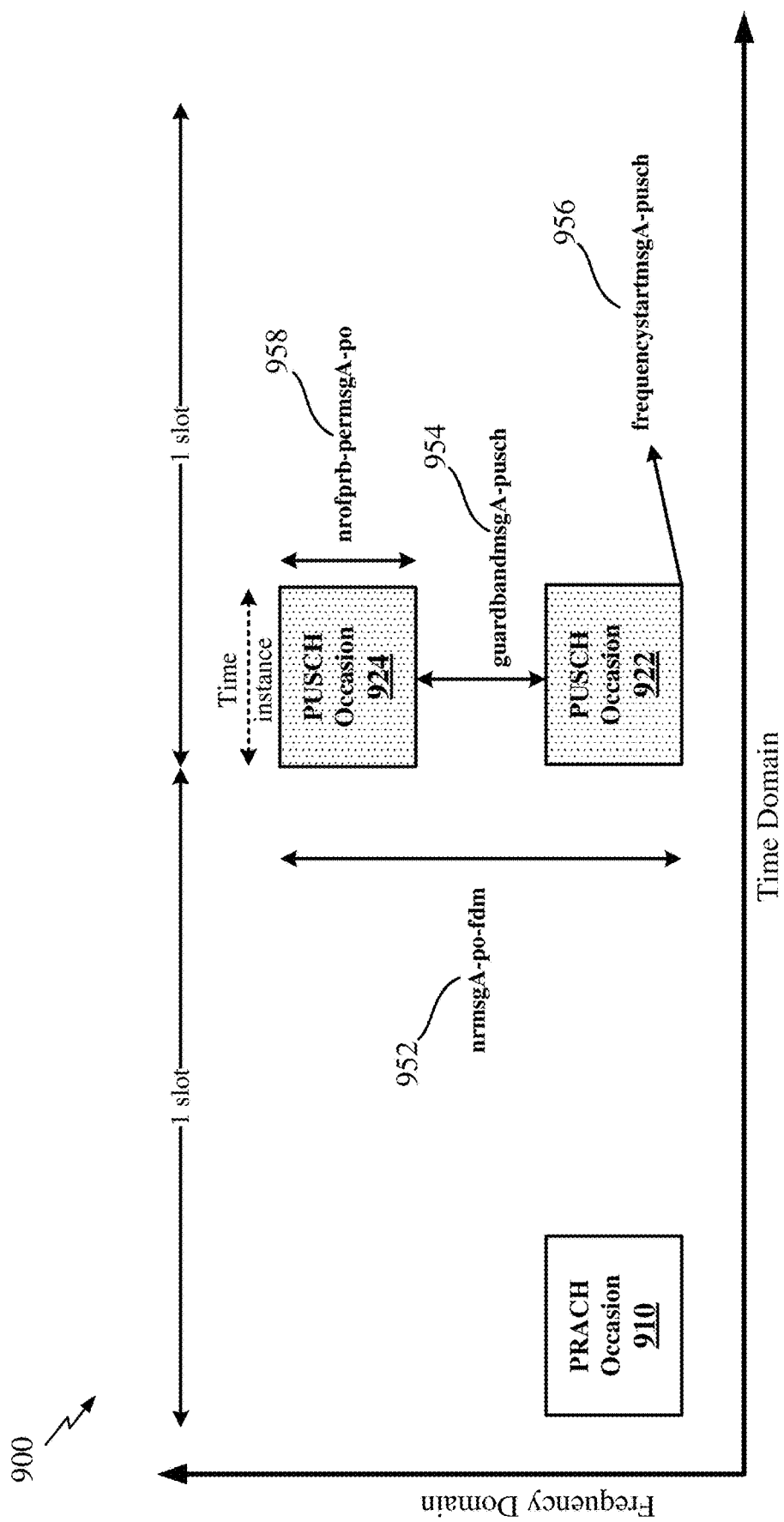
FIG. 9 is an example diagram illustrating parameters for the frequency domain configuration of the static configuration information for communication of payload data of a message A in a two-step random access procedure, according to some aspects.

FIG. 9 is an example diagram 900 illustrating parameters for the frequency domain configuration of the static configuration information for communication of payload data of a message A in a two-step random access procedure, according to some aspects. In FIG. 9, the horizontal axis represents a time domain and the vertical axis represents a frequency domain. An RU may receive a preamble (e.g., PRACH data) of the message A in the two-step random access procedure during a PRACH occasion 910. After receiving the preamble of the message A, the RU may receive the payload data of the message A during a first PUSCH occasion 922 and/or a second PUSCH occasion 924. The payload data of the message A may be PUSCH data. In FIG. 9, the first PUSCH occasion 922 and the second PUSCH occasion 924 may occur at a same (or substantially same) time instance and at different frequency ranges.

In FIG. 9, a parameter nrmsgA-po-fdm 952 of the frequency domain configuration represents a number of frequency-multiplexed PUSCH occasions available per time instance. In FIG. 9, the frequency-multiplexed PUSCH occasions available per time instance are the first PUSCH occasion 922 and the second PUSCH occasion 924, and thus the value of the parameter nrmsgA-po-fdm 952 is 2. A parameter guardbandmsgA-pusch 954 of the frequency domain configuration represents a number of resource blocks by which consecutive PUSCH occasions in a frequency domain are separated. In FIG. 9, the value of the parameter guardbandmsgA-pusch 954 may indicate a number of resource blocks by which the first PUSCH occasion 922 and the second PUSCH occasion 924 are separated in frequency domain A parameter frequencystartmsgA-pusch 956 of the frequency domain configuration represents an offset value with respect to a PRB #0 or a VRB #0 to indicate a starting PRB or a starting VRB of the first PUSCH occasion 922. A parameter nrofprb-permsgA-po 958 of the frequency domain configuration represents a number of PRBs per PUSCH occasion. Hence, for example, the number of PRBs in each of the first PUSCH occasion 922 and the second PUSCH occasion 924 may correspond to the number of PRBs indicated by the parameter nrofprb-permsgA-po 958.

In an aspect, the time domain configuration may include parameters, such as a number of slots containing PUSCH occasion(s) with a same time domain allocation, a guard period by which consecutive PUSCH occasions in a time domain are separated, a number of contiguous time domain PUSCH occasions in each slot including the guard period, a parameter indicating a start symbol and a length corresponding to a number of consecutive symbols allocated for receiving the payload (e.g., PUSCH) data via the message as well as a PUSCH mapping type for receiving the payload (e.g., PUSCH) data via the message, a parameter indicating a start symbol and a length corresponding to a number of consecutive symbols allocated for receiving the payload data via the message, and a reference signal (e.g., DMRS) mapping type, and a time offset between a start of each PRACH slot and a first PUSCH occasion slot. For example, the number of slots containing PUSCH occasion(s) with a same time domain allocation may be represented by a parameter "nrofslotsmsgA-pusch," the guard period by which consecutive PUSCH occasions in a time domain are separated is represented by a parameter "guardperiodmsgA-pusch," and the number of contiguous time domain PUSCH occasions in each slot including the guard period may be represented by a parameter "nrofmsgA-po-perslot." For example, the parameter indicating a start symbol and a length corresponding to a number of consecutive symbols allocated for receiving the payload data via the message as well as a PUSCH mapping type for receiving the payload data via the message may be represented by a parameter "msgA-pusch-timedomainallocation," which includes values for the a start symbol and the length as well as the PUSCH mapping type. For example, the parameter indicating a start symbol and a length corresponding to a number of consecutive symbols allocated for receiving the payload data via the message, and a reference signal mapping type may be represented by a parameter "startsymbolandlength-msgA-po," and a time offset between a start of each PRACH slot and a first PUSCH occasion slot may be represented by a parameter "msgA-pusch-timedomainoffset."

Figure 10:
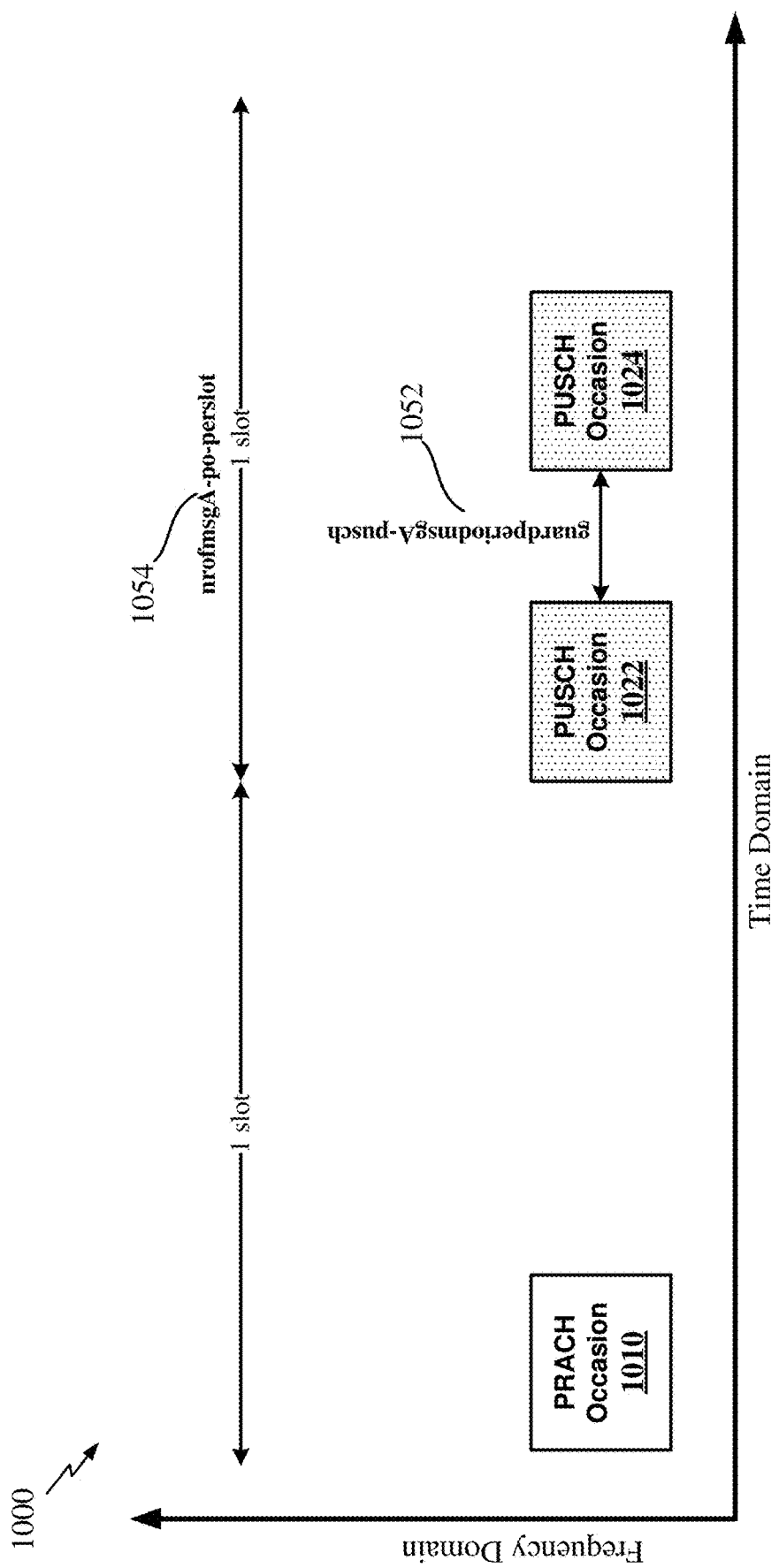
FIG. 10 is an example diagram illustrating parameters for the time domain configuration of the static configuration information for communication of payload data of a message A in a two-step random access procedure, according to some aspects.

FIG. 10 is an example diagram 1000 illustrating parameters for the time domain configuration of the static configuration information for communication of payload data of a message A in a two-step random access procedure, according to some aspects. In FIG. 10, the horizontal axis represents a time domain and the vertical axis represents a frequency domain. An RU may receive a preamble (e.g., PRACH data) of the message A in the two-step random access procedure during a PRACH occasion 1010. After receiving the preamble of the message A, the RU may receive the payload data of the message A during a first PUSCH occasion 1022 and/or a second PUSCH occasion 1024. The payload data of the message A may be PUSCH data. In FIG. 10, the first PUSCH occasion 1022 and the second PUSCH occasion 1024 may occur at a same (or substantially same) frequency range and at different time instances.

In FIG. 10, a parameter guardperiodmsgA-pusch 1052 of the time domain configuration represents a guard period by which consecutive PUSCH occasions in a time domain are separated. Hence, in FIG. 10, the parameter guardperiodmsgA-pusch 1052 represents the guard period by which the first PUSCH occasion 1022 and the second PUSCH occasion 1024 are separated. A parameter nrofmsgA-po-perslot 1054 of the time domain configuration represents a number of contiguous time domain PUSCH occasions in each slot including the guard period. In FIG. 10, in 1 slot, the first PUSCH occasion 1022 and the second PUSCH occasion 1024 are the contiguous time domain PUSCH occasions, and thus the value of the parameter nrofmsgA-po-perslot 1054 is 2.

In an aspect, the reference signal configuration may include a DMRS configuration including parameters, such as a position for each DMRS symbol in a slot, an indicator indicating DMRS resource element(s) in a resource block for a DMRS symbol, and/or a bit indicating whether non-DMRS resource element(s) within a DMRS symbol are occupied by the payload data or not. In some aspects, because the PUSCH data of the message A and the reference signal may be encoded differently, this reference signal configuration may be used to configure the RU for the communication of the reference signal such as the DMRS. For example, the position for each DMRS symbol in a slot may be represented by a parameter "msgA-dmrs-timeposition," the indicator indicating DMRS resource element(s) in a resource block for a DMRS symbol may be represented by a parameter "msgA-dmrs-frequencyposition," and the bit indicating whether non-DMRS resource element(s) within a DMRS symbol are occupied by the payload data or not may be represented by a parameter "msgA-nondmrs-frequencyposition." In an aspect, the position for each DMRS symbol in a slot may be indicated by a bitmask, and the indicator indicating DMRS resource element(s) in a resource block for a DMRS symbol may be indicated by another bitmask. In an aspect, the bit indicating whether non-DMRS resource element(s) within a DMRS symbol are occupied by the payload data or not may be a single bit. For example, the value 1 of the single bit may indicate that non-DMRS resource element(s) within a DMRS symbol are occupied by the payload data, and the value 0 of the single bit may that non-DMRS resource element(s) within a DMRS symbol are not occupied by the payload data.

FIG. 11 is an example diagram 1100 illustrating a Yang module for static configuration information for receiving PUSCH data communicated via a message A of the two-step random access procedure, according to some aspects. For example, the static configuration support indication may be a parameter "MSGA-PUSCH-STATIC-CONFIGURATION-SUPPORTED" in o-ran-module-cap of the Yang module and may be communicated from a RU to a DU via an M-plane communication at first, to indicate that the RU supports the static PUSCH configuration capability. As shown in FIG. 11, the static configuration information may be provided under "static-msgA-pusch-configurations,"

which also indicates the presence of the parameter "MSGA-PUSCH-STATIC-CONFIGURATION-SUPPORTED" indicating the RU supports the static PUSCH configuration capability.

As shown in FIG. 11, the static configuration information may include the frequency domain configuration such as "nrmsgA-po-fdm," "guardbandmsgA-pusch," "frequencystartmsgA-pusch," "nrofprb-permsgA-po," and "msgA-intraslotfrequencyhopping." In FIG. 11, the static configuration information may also include the time domain configuration such as "nrofslotsmsgA-pusch," "nrofmsgA-po-perslot," "msgA-pusch-timedomainallocation," "startsymbolandlengthmsgA-po," and "msgA-pusch-timedomainoffset." FIG. 11 further shows that the static configuration information may further include a reference signal configuration such as "msgA-dmrs-timeposition," "msgA-dmrs-frequencyposition," and "msgA-nondmrs-frequencyposition."

In some cases, the resources allocated for at least a portion of the payload data (e.g., PUSCH data) of the message A may also be allocated for data/signal (e.g., SRS, PUCCH data) different from the payload data, and thus the use of the allocated resources overlap for the payload data and the data/signal different from the payload data. In such cases, rate matching around such allocated resources overlapping for the payload data and the data/signal different from the payload may be needed. For example, the RU may not need to send quadrature data (e.g., in-phase and quadrature (IQ) symbols) corresponding to the allocated resources overlapping for the payload data and the data/signal different from the payload.

Hence, in an aspect, the DU may transmit, to the RU, a resource overlap indicator that indicates uplink resource(s) allocated for at least a portion of the payload data and for a different data that is different from the payload data. In an aspect, the different data, which is different from the payload data, may be a PUCCH data and/or a reference signal such as an SRS. For example, the resource overlap indicator may indicate a frequency range and a time range of the uplink resource(s) (e.g., REs). When the RU receives the resource overlap indicator, the RU may refrain from transmitting quadrature data corresponding to the uplink resource(s) indicated by the resource overlap indicator. For example, if particular REs are allocated for a signal/data different from the payload data, and the particular REs are also allocated for the payload data, then the RU may not successfully receive the payload data from the UE in the particular REs, and thus the RU may not transmit the quadrature data corresponding to the particular REs to the DU. As such, fronthaul bandwidth not used for the quadrature data corresponding to the particular REs is conserved.

In an aspect, the transmission of the quadrature data to the UE may be controlled by an enable indicator that indicates whether to transmit the quadrature data. In particular, the DU may transmit, and the RU may receive, an enable indicator to the radio unit that indicates whether to transmit quadrature data corresponding to the uplink resource(s) to the DU based on the resource overlap indicator. In this aspect, the RU may refrain from transmitting the quadrature data corresponding to the uplink resource(s) indicated by the resource overlap indicator when the enable indicator received indicates not to transmit the quadrature data corresponding to the uplink resource(s) allocated for at least the portion of the payload data and the different data. In this case, in one example, the enable indicator may further include a duration to refrain from transmitting the quadrature data. On the other hand, if the enable indicator received indicates to transmit the quadrature data corresponding to the uplink resource(s) allocated for at least the portion of the payload data and the different data, the RU may transmit the quadrature data corresponding to the uplink resource(s) indicated by the resource overlap indicator, regardless of whether the RU has received the resource overlap indicator from the DU. In this case, in one example, the enable indicator may further include a duration to transmit the quadrature data. In an aspect, the enable indicator may be transmitted periodically, or dynamically, or semi-statically, using a C-plane communication to the RU. For example, the enable indicator may be indicated in a C-Plane section extension, such as an enum value.

For some types of communications, such as mMTCs, data channels such as a PDSCH and a PUSCH may be configured with one or more repetitions. Hence, in an aspect, the DU may transmit a repetition indicator to the RU, where the repetition indicator indicates a configuration of an uplink data channel (e.g., PUSCH) with one or more repetitions for receiving the payload data (e.g., PUSCH data). When the RU receives the repetition indicator, the RU may configure the RU such that the RU may receive the payload data and one or more repetitions of the payload data from the UE. Therefore, the repetition indicator may provide support for repetitions of the payload data (e.g., PUSCH data) when communication of the payload data is statically configured in the O-RAN based on the static configuration information.

In LTE, a direct current (DC) location inside a carrier may be a fixed location within the carrier, and thus both a base station and a UE may know the DC location. The DC subcarrier in LTE may not be allocated for any data, control or reference signal allocation. On the other hand, in NR, a DC location is not fixed and may also be outside the carrier. Further, in NR, the DC sub-carrier may be allocated for data, control and/or reference signals. DC subcarriers in NR may act as an interference/noise and thus may cause performance degradation. Therefore, for example, some receivers may apply DC rejection filtering or puncturing to disregard the tone affected by the DC subcarriers. For these reasons, in NR, the DC subcarrier location may be broadcast over the air in system information block (e.g., SIB1). In O-RAN, a DU, a CU and an RU may be implemented in geographically different locations. In order to provide downlink DC location in a SIB that is generated at a DU and/or a CU, the DU and/or the CU need to know the DC location in the RU. However, in the current O-RAN, the DC location is not provided from the RU to the DU and/or the CU.

In an aspect, the RU may transmit, and the DU may receive, a DC subcarrier location indicating a location of a DC subcarrier used to communicate with the UE. Subsequently, the DU may schedule a downlink transmission of downlink data that carries a system information block (e.g., SIB1), and transmits the downlink data carrying the system information block to the RU. When the RU receives the downlink data carrying the system information block, the RU transmits the downlink data to the UE. Accordingly, the DC subcarrier location is provided to the DU and is carried in the system information block generated by the DU and/or the CU, such that the UE receiving the system information block may have information about the DC subcarrier location.

Figure 12:
FIG. 12 is an example diagram illustrating a Yang module for providing a DC subcarrier location to the DU, according to some aspects.

FIG. 12 is an example diagram 1200 illustrating a Yang module for providing a DC subcarrier location to the DU, according to some aspects. As shown in FIG. 12, o-ran-module-cap of the Yang module may include a parameter for the DC subcarrier location, which is "txDirectCurrentLocationCarrier_0 uint16, . . . -txDirectCurrentLocationCarrier_

(max-num-carriers-dl-1) uint16." For example, if there are four DC subcarrier locations, this parameter may indicate four DC subcarrier locations respectively via txDirectCurrentLocationCarrier_0 uint16, txDirectCurrentLocationCarrier_1 uint16, txDirectCurrentLocationCarrier_2 uint16, txDirectCurrentLocationCarrier_3 uint16.

In an aspect, sometime after statically configuring (e.g., via an M-plane) the RU with the static configuration information for receiving the payload of the message A, the DU may transmit a static configuration stop indicator to the RU, such that the RU may stop the static configuration of the RU for receiving the payload of the message A in response to receiving the static configuration stop indicator. Further, in response to receiving the static configuration stop indicator, the RU may fall back to a dynamic configuration for receiving the payload of the message A. In an aspect, the static configuration stop indicator may be transmitted to the RU via a C-plane message. In an aspect, when the RU is not configured with the static configuration for receiving the payload of the message A (e.g., when the RU is configured with the dynamic configuration), the DU may transmit a static configuration start indicator to the RU, so as to configure the RU with the static configuration for receiving the payload of the message A. For example, sometime after the fall back to the dynamic configuration for receiving the payload of the message A in response to the static configuration stop indicator, if the RU receives the static configuration start indicator, the RU may start the static configuration of the RU for receiving the payload of the message A (e.g., based on the static configuration information from DU), and may stop the dynamic configuration. The static configuration start message may be transmitted to the RU via a C-plane message.

In an aspect, the static configuration stop indicator may include a stop duration to stop the static configuration for receiving the payload of the message A. Hence, for example, if the RU configured with the static configuration for receiving the payload receives the static configuration stop indicator from the DU, the RU may stop the static configuration for receiving the payload and fall back to the dynamic configuration for receiving the payload during the stop duration. When the stop duration expires, the RU may revert to the static configuration for receiving the payload. In an aspect, the static configuration start indicator may include a static duration to maintain the static configuration (e.g., before falling back to the dynamic configuration). For example, the when the RU receives the static configuration start indicator with the static duration, the RU may maintain the static configuration for receiving the payload during the static duration. When the static duration expires, the RU may stop the static configuration for receiving the payload and may revert to the dynamic configuration for receiving the payload.

Figure 13:
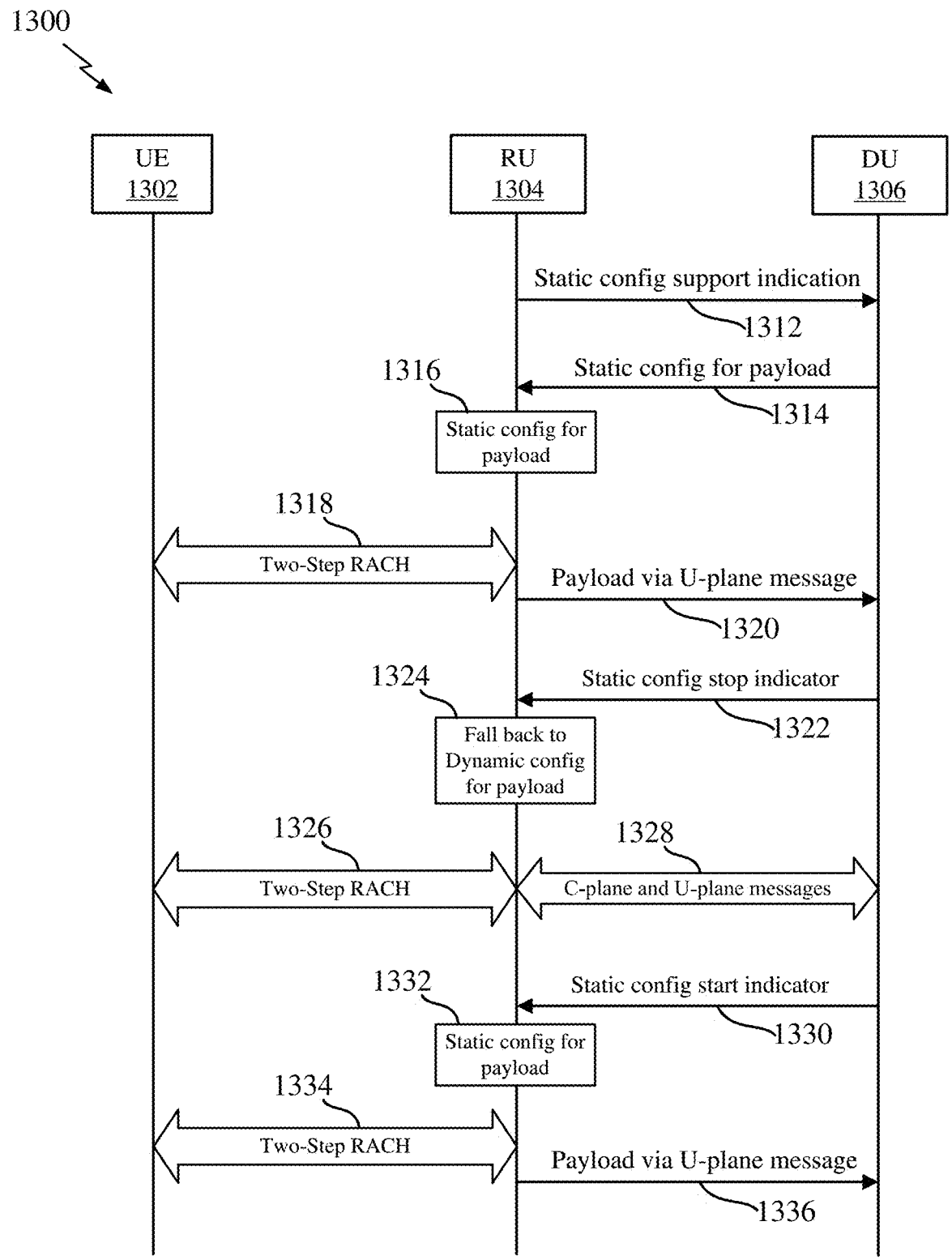
FIG. 13 is an example diagram illustrating features performed by a UE, an RU, and a DU in an O-RAN, with a static configuration stop indicator and a static configuration start indicator, according to some aspects.

FIG. 13 is an example diagram 1300 illustrating features performed by a UE, an RU, and a DU in an O-RAN, with a static configuration stop indicator and a static configuration start indicator, according to some aspects. In FIG. 13, a UE 1302 may communicate with an RU 1304, which may communicate with a DU 1306. The UE 1302 may be similar to the scheduled entity/UE 106, 810, the RU 1304 may be similar to the RU 740, 840, and the DU 1306 may be similar to the DU 730, 830.

At 1312, the DU 1306 may transmit a static configuration support indication for receiving payload data via a message A in a two-step random access procedure. After receiving the static configuration support indication, at 1314, the DU 1306 may transmit static configuration information for receiving the payload data communicated via the message A. In an example, the static configuration information may be transmitted via an M-plane message. When the RU 1304 receives the static configuration information, at 1316, the RU 1304 may statically configure the RU 1304 for receiving the payload data of the message A based on the static configuration information. At 1318, the UE 1302 and the RU 1304 may perform the two-step random access procedure, during which the RU 1304 may receive the payload data of the message A based on the static configuration information for receiving the payload data. At 1320, the RU 1304 may transmit the payload data of the message A to the DU 1306 using a U-plane message.

At 1322, the RU 1304 may receive a static configuration stop indicator from the DU 1306, where the static configuration stop indicator indicates for the RU 1304 to stop the static configuration of the RU 1304 based on the static configuration information for receiving the payload data. At 1324, in response to the static configuration stop indicator, the RU 1304 may refrain from statically configuring the RU 1304 based on the static configuration information for receiving the payload data and may fall back to a dynamic configuration for receiving the payload data. At 1326, the UE 1302 and the RU 1304 may perform the two-step random access procedure, during which the RU 1304 may receive the payload data of the message A based on the dynamic configuration for receiving the payload data. At 1328, the RU 1304 and the DU 1306 may exchange C-plane and U-plane messages to transmit the payload data of the message A from the RU 1304 to the DU 1306.

At 1330, the RU 1304 may receive a static configuration start indicator from the DU 1306, where the static configuration start indicator indicates for the RU 1304 to start (or restart) the static configuration of the RU 1304 based on the static configuration information for receiving the payload data. At 1332, in response to the static configuration start indicator, the RU 1304 may (again) statically configure the RU 1304 based on the static configuration information for receiving the payload data. At 1334, the UE 1302 and the RU 1304 may perform the two-step random access procedure, during which the RU 1304 may receive the payload data of the message A based on the static configuration information for receiving the payload data. At 1336, the RU 1304 may transmit the payload data of the message A to the DU 1306 using a U-plane message.

Figure 14:
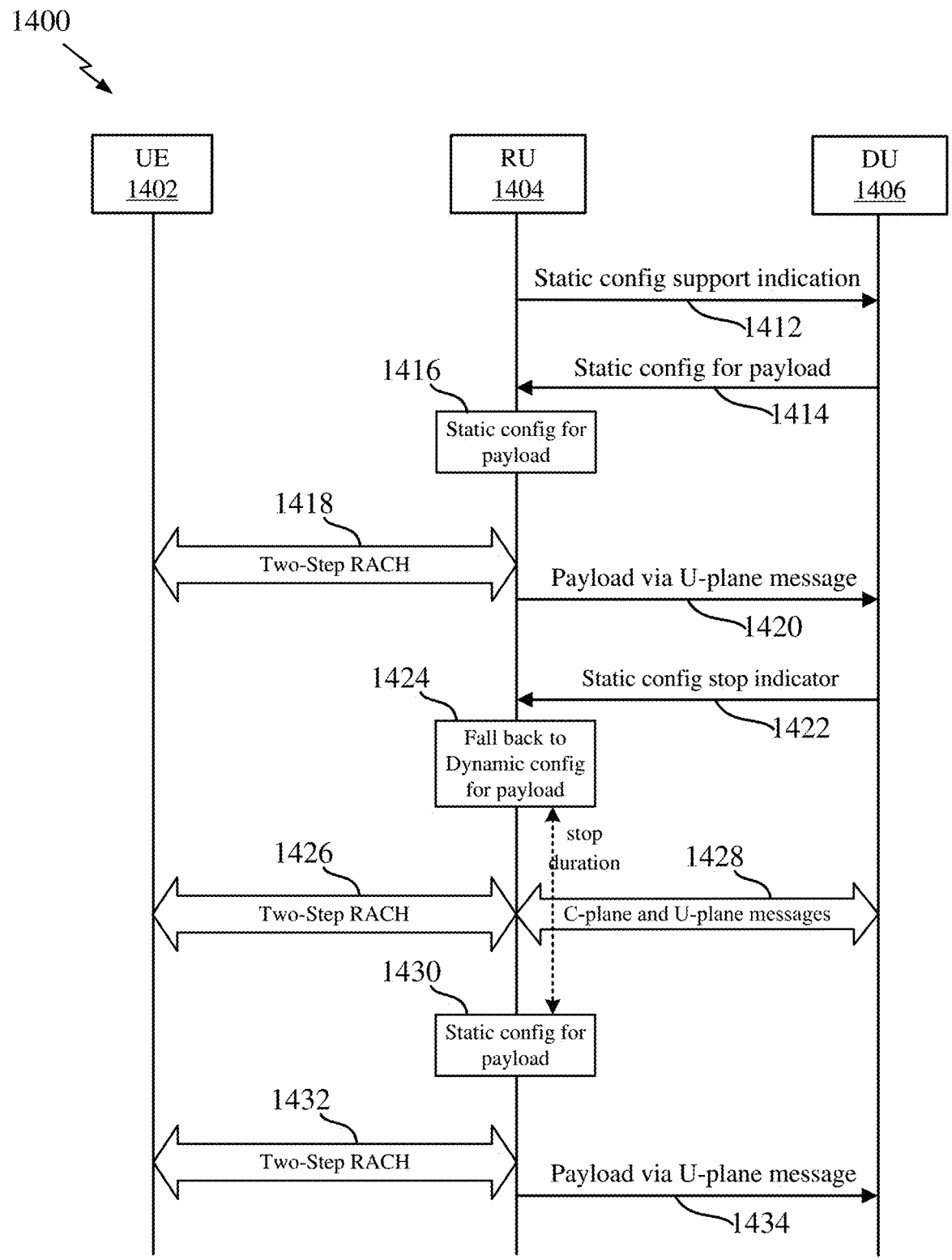
FIG. 14 is an example diagram illustrating features performed by a UE, an RU, and a DU in an O-RAN, with a static configuration stop indicator having a stop duration, according to some aspects.

FIG. 14 is an example diagram 1400 illustrating features performed by a UE, an RU, and a DU in an O-RAN, with a static configuration stop indicator having a stop duration, according to some aspects. In FIG. 14, a UE 1402 may communicate with an RU 1404, which may communicate with a DU 1406. The UE 1402 may be similar to the scheduled entity/UE 106, 810, the RU 1404 may be similar to the RU 740, 840, and the DU 1406 may be similar to the DU 730, 830.

At 1412, the DU 1406 may transmit a static configuration support indication for receiving payload data via a message A in a two-step random access procedure. After receiving the static configuration support indication, at 1414, the DU 1406 may transmit static configuration information for receiving the payload data communicated via the message A. In an example, the static configuration information may be transmitted via an M-plane message. When the RU 1404 receives the static configuration information, at 1416, the RU 1404 may statically configure the RU 1404 for receiving the payload data of the message A based on the static configuration information. At 1418, the UE 1402 and the RU 1404 may perform the two-step random access procedure, during which the RU 1404 may receive the payload data of the message A based on the static configuration information for receiving the payload data. At 1420, the RU 1404 may transmit the payload data of the message A to the DU 1406 using a U-plane message.

At 1422, the RU 1404 may receive a static configuration stop indicator with a stop duration from the DU 1406, where the static configuration stop indicator indicates for the RU 1404 to stop configuring the radio unit based on the static configuration information for receiving the payload data, for the stop duration. At 1424, in response to the static configuration stop indicator, the RU 1404 may refrain from statically configuring the RU 1404 based on the static configuration information for receiving the payload data and may fall back to a dynamic configuration for receiving the payload data. Because the static configuration stop indicator includes the stop duration, the RU 1404 may refrain from statically configuring the RU 1404 based on the static configuration information for receiving the payload data and may fall back to a dynamic configuration for receiving the payload data, for the stop duration. At 1426, while the stop duration has not expired, the UE 1402 and the RU 1404 may perform the two-step random access procedure, during which the RU 1404 may receive the payload data of the message A based on the dynamic configuration for receiving the payload data. At 1428, the RU 1404 and the DU 1406 may exchange C-plane and U-plane messages to transmit the payload data of the message A from the RU 1404 to the DU 1406.

At 1430, when the stop duration expires, the RU 1404 may (again) statically configure the RU 1304 based on the static configuration information for receiving the payload data. At 1432, the UE 1402 and the RU 1404 may perform the two-step random access procedure, during which the RU 1404 may receive the payload data of the message A based on the static configuration information for receiving the payload data. At 1434, the RU 1404 may transmit the payload data of the message A to the DU 1406 using a U-plane message.

Figure 15:
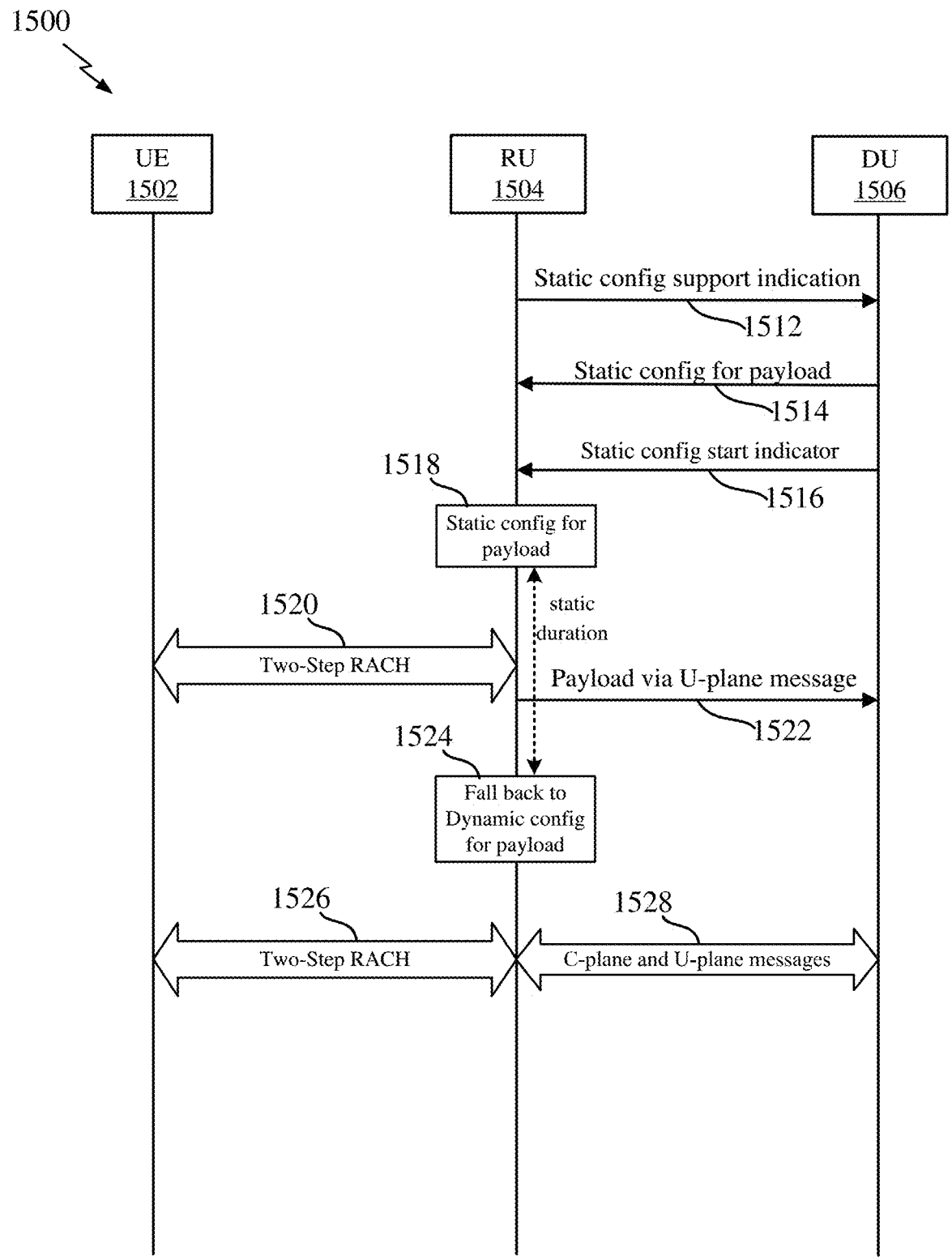
FIG. 15 is an example diagram illustrating features performed by a UE, an RU, and a DU in an O-RAN, with a static configuration start indicator having a static duration, according to some aspects.

FIG. 15 is an example diagram 1500 illustrating features performed by a UE, an RU, and a DU in an O-RAN, with a static configuration start indicator having a static duration, according to some aspects. In FIG. 15, a UE 1502 may communicate with an RU 1504, which may communicate with a DU 1506. The UE 1502 may be similar to the scheduled entity/UE 106, 810, the RU 1504 may be similar to the RU 740, 840, and the DU 1506 may be similar to the DU 730, 830.

At 1512, the DU 1506 may transmit a static configuration support indication for receiving payload data via a message A in a two-step random access procedure. After receiving the static configuration support indication, at 1514, the DU 1506 may transmit static configuration information for receiving the payload data communicated via the message A. In an example, the static configuration information may be transmitted via an M-plane message.

At 1516, the DU 1506 may transmit a static configuration start indicator with a static duration, where the static configuration start indicator indicates for the RU 1304 to start a static configuration the RU 1304 based on the static configuration information for receiving the payload data, for the static duration. When the RU 1504 receives the static configuration start indicator, at 1518, the RU 1504 may statically configure the RU 1504 for receiving the payload data of the message A based on the static configuration information, for the static duration. At 1520, while the static duration has not expired, the UE 1502 and the RU 1504 may perform the two-step random access procedure, during which the RU 1504 may receive the payload data of the message A based on the static configuration information for receiving the payload data. At 1522, the RU 1504 may transmit the payload data of the message A to the DU 1506 using a U-plane message.

At 1524, when the static duration expires, the RU 1504 may refrain from statically configuring the RU 1504 based on the static configuration information for receiving the payload data and may fall back to a dynamic configuration for receiving the payload data. At 1526, the UE 1502 and the RU 1504 may perform the two-step random access procedure, during which the RU 1504 may receive the payload data of the message A based on the dynamic configuration for receiving the payload data. At 1528, the RU 1504 and the DU 1506 may exchange C-plane and U-plane messages to transmit the payload data of the message A from the RU 1504 to the DU 1506.

Figure 16:
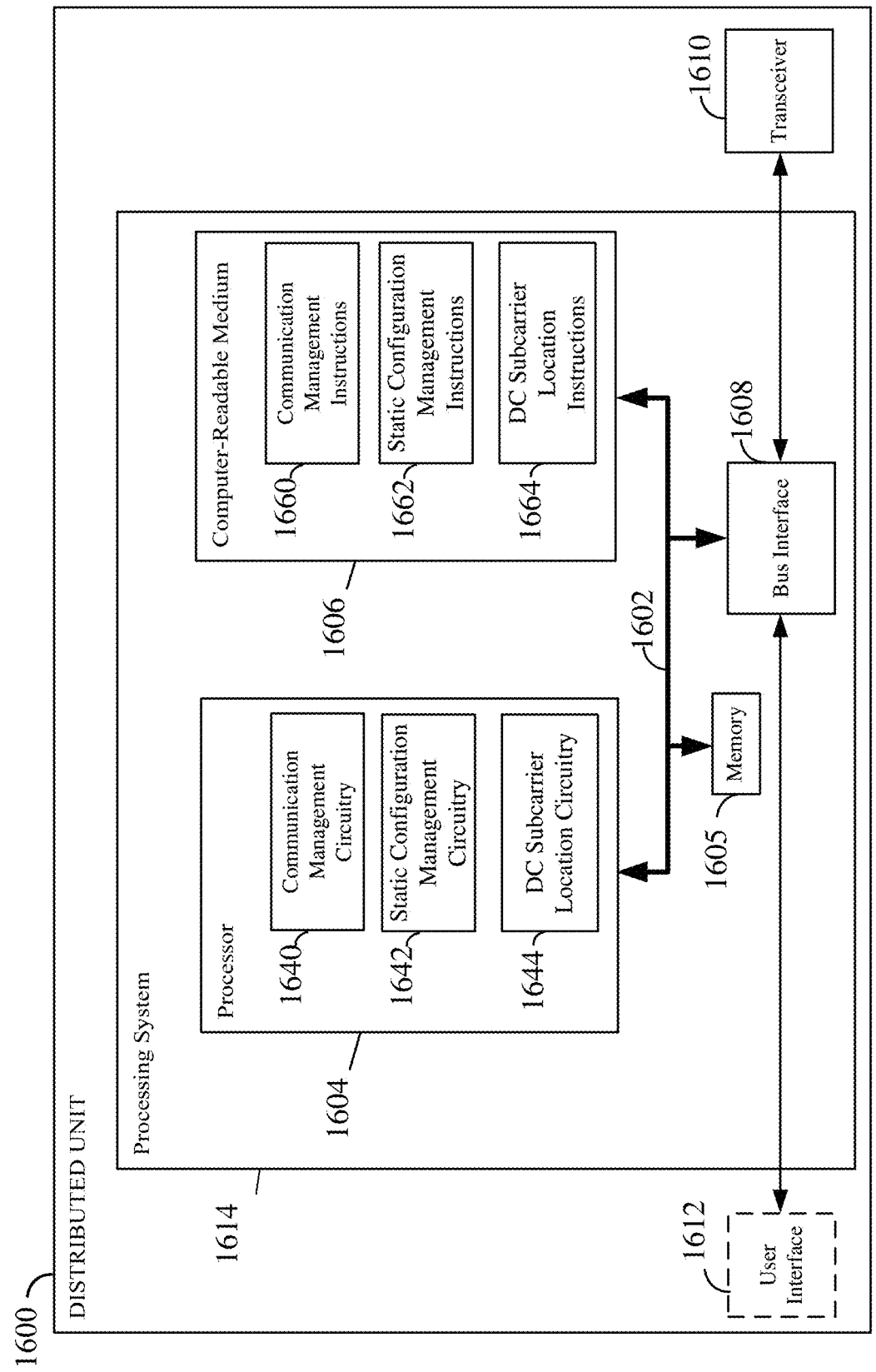
FIG. 16 is a block diagram conceptually illustrating an example of a hardware implementation for a distributed unit according to some aspects.

FIG. 16 is a block diagram illustrating an example of a hardware implementation for a distributed unit 1600 employing a processing system 1614. For example, the distributed unit 1600 may be a DU as illustrated in any one or more of FIGS. 7, 8, 13, 14, and/or 15.

The distributed unit 1600 may be implemented with a processing system 1614 that includes one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the distributed unit 1600 may be configured to perform any one or more of the functions described herein. That is, the processor 1604, as utilized in a distributed unit 1600, may be used to implement any one or more of the processes and procedures described below and illustrated in FIGS. 17-19.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable storage medium 1606). The bus 1602 may also link various other circuits such as timing sources, peripherals, voltage regulators, and power management circuits, which are well known in the art, and therefore, will not be described any further. A bus interface 1608 provides an interface between the bus 1602 and a transceiver 1610. The transceiver 1610 provides a communication interface or means for communicating with various other apparatus over a transmission medium. Depending upon the nature of the apparatus, a user interface 1612 (e.g., keypad, display, speaker, microphone, joystick) may also be provided. Of course, such a user interface 1612 is optional, and may be omitted in some examples, such as a base station.

In some aspects of the disclosure, the processor 1604 may include communication management circuitry 1640 configured for various functions, including, for example, receiving, from a radio unit, a static configuration support indication for receiving payload data via a message in a two-step random access procedure, the message including a preamble and the payload data. For example, the communication management circuitry 1640 may be configured to implement one or more of the functions described below in relation to FIGS. 17 and 19, including, e.g., blocks 1702 and 1902.

In some aspects, the communication management circuitry 1640 may be configured for various functions, including, for example, scheduling a downlink transmission of downlink data that carries a system information block including the DC subcarrier location. For example, the communication management circuitry 1640 may be configured to implement one or more of the functions described below in relation to FIGS. 18-19, including, e.g., blocks 1804 and 1918.

In some aspects, the communication management circuitry 1640 may be configured for various functions, including, for example, transmitting the downlink data to the radio unit. For example, the communication management circuitry 1640 may be configured to implement one or more of the functions described below in relation to FIGS. 18-19, including, e.g., blocks 1806 and 1920.

In some aspects, the communication management circuitry 1640 may be configured for various functions, including, for example, transmitting a resource overlap indicator to the radio unit, wherein the resource overlap indicator indicates one or more uplink resources allocated for at least a portion of the payload data and for a different data, different from the payload data. For example, the communication management circuitry 1640 may be configured to implement one or more of the functions described below in relation to FIG. 19, including, e.g., block 1906.

In some aspects, the communication management circuitry 1640 may be configured for various functions, including, for example, transmitting an enable indicator to the radio unit, wherein the enable indicator indicates whether to transmit quadrature data corresponding to the one or more uplink resources to the distributed unit based on the resource overlap indicator. For example, the communication management circuitry 1640 may be configured to implement one or more of the functions described below in relation to FIG. 19, including, e.g., block 1908.

In some aspects, the communication management circuitry 1640 may be configured for various functions, including, for example, transmitting a static configuration stop indicator to the radio unit. For example, the communication management circuitry 1640 may be configured to implement one or more of the functions described below in relation to FIG. 19, including, e.g., block 1910.

In some aspects, the communication management circuitry 1640 may be configured for various functions, including, for example, transmitting a static configuration start indicator to the radio unit. For example, the communication management circuitry 1640 may be configured to implement one or more of the functions described below in relation to FIG. 19, including, e.g., block 1912.

In some aspects, the communication management circuitry 1640 may be configured for various functions, including, for example, transmitting a repetition indicator to the radio unit, wherein the repetition indicator indicates a configuration of an uplink data channel with one or more repetitions for receiving the payload data. For example, the communication management circuitry 1640 may be configured to implement one or more of the functions described below in relation to FIG. 19, including, e.g., block 1914.

In some aspects of the disclosure, the processor 1604 may include static configuration management circuitry 1642 configured for various functions, including, for example, transmitting, in response to receiving the static configuration support indication, static configuration information to the radio unit, the static configuration information for receiving the payload data communicated via the message. For example, the static configuration management circuitry 1642 may be configured to implement one or more of the functions described below in relation to FIGS. 17 and 19, including, e.g., blocks 1704 and 1904.

In some aspects of the disclosure, the processor 1604 may include DC subcarrier location circuitry 1644 configured for various functions, including, for example, receiving a DC subcarrier location from the radio unit, the DC subcarrier location indicating a location of a DC subcarrier used to communicate with a UE. For example, the DC subcarrier location circuitry 1644 may be configured to implement one or more of the functions described below in relation to FIGS. 18 and 19, including, e.g., blocks 1802 and 1916.

The processor 1604 is responsible for managing the bus 1602 and general processing, including the execution of software stored on the computer-readable storage medium 1606. The software, when executed by the processor 1604, causes the processing system 1614 to perform the various functions described below for any particular apparatus. The computer-readable storage medium 1606 and the memory 1605 may also be used for storing data that is manipulated by the processor 1604 when executing software.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1606. The computer-readable storage medium 1606 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1606 may reside in the processing system 1614, external to the processing system 1614, or distributed across multiple entities including the processing system 1614. The computer-readable storage medium 1606 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the computer-readable storage medium 1606 may include communication management software/instructions 1660 configured for various functions, including, for example, receiving, from a radio unit, a static configuration support indication for receiving payload data via a message in a two-step random access procedure, the message including a preamble and the payload data. For example, the communication management software/instructions 1660 may be configured to implement one or more of the functions described below in relation to FIGS. 17 and 19, including, e.g., blocks 1702 and 1902.

In some aspects, the communication management software/instructions 1660 may be configured for various functions, including, for example, scheduling a downlink transmission of downlink data that carries a system information block including the DC subcarrier location. For example, the communication management software/instructions 1660 may be configured to implement one or more of the functions described below in relation to FIGS. 18-19, including, e.g., blocks 1804 and 1918.

In some aspects, the communication management software/instructions 1660 may be configured for various functions, including, for example, transmitting the downlink data to the radio unit. For example, the communication management software/instructions 1660 may be configured to implement one or more of the functions described below in relation to FIGS. 18-19, including, e.g., blocks 1806 and 1920.

In some aspects, the communication management software/instructions 1660 may be configured for various functions, including, for example, transmitting a resource overlap indicator to the radio unit, wherein the resource overlap indicator indicates one or more uplink resources allocated for at least a portion of the payload data and for a different data, different from the payload data. For example, the communication management software/instructions 1660 may be configured to implement one or more of the functions described below in relation to FIG. 19, including, e.g., block 1906.

In some aspects, the communication management software/instructions 1660 may be configured for various functions, including, for example, transmitting an enable indicator to the radio unit, wherein the enable indicator indicates whether to transmit quadrature data corresponding to the one or more uplink resources to the distributed unit based on the resource overlap indicator. For example, the communication management software/instructions 1660 may be configured to implement one or more of the functions described below in relation to FIG. 19, including, e.g., block 1908.

In some aspects, the communication management software/instructions 1660 may be configured for various functions, including, for example, transmitting a static configuration stop indicator to the radio unit. For example, the communication management software/instructions 1660 may be configured to implement one or more of the functions described below in relation to FIG. 19, including, e.g., block 1910.

In some aspects, the communication management software/instructions 1660 may be configured for various functions, including, for example, transmitting a static configuration start indicator to the radio unit. For example, the communication management software/instructions 1660 may be configured to implement one or more of the functions described below in relation to FIG. 19, including, e.g., block 1912.

In some aspects, the communication management software/instructions 1660 may be configured for various functions, including, for example, transmitting a repetition indicator to the radio unit, wherein the repetition indicator indicates a configuration of an uplink data channel with one or more repetitions for receiving the payload data. For example, the communication management software/instructions 1660 may be configured to implement one or more of the functions described below in relation to FIG. 19, including, e.g., block 1914.

In some aspects of the disclosure, the computer-readable storage medium 1606 may include static configuration management software/instructions 1662 configured for various functions, including, for example, transmitting, in response to receiving the static configuration support indication, static configuration information to the radio unit, the static configuration information for receiving the payload data communicated via the message. For example, the static configuration management software/instructions 1662 may be configured to implement one or more of the functions described below in relation to FIGS. 17 and 19, including, e.g., blocks 1704 and 1904.

In some aspects of the disclosure, the computer-readable storage medium 1606 may include DC subcarrier location software/instructions 1664 configured for various functions, including, for example, receiving a DC subcarrier location from the radio unit, the DC subcarrier location indicating a location of a DC subcarrier used to communicate with a UE. For example, the DC subcarrier location software/instructions 1664 may be configured to implement one or more of the functions described below in relation to FIGS. 18 and 19, including, e.g., blocks 1802 and 1916.

Figure 17:
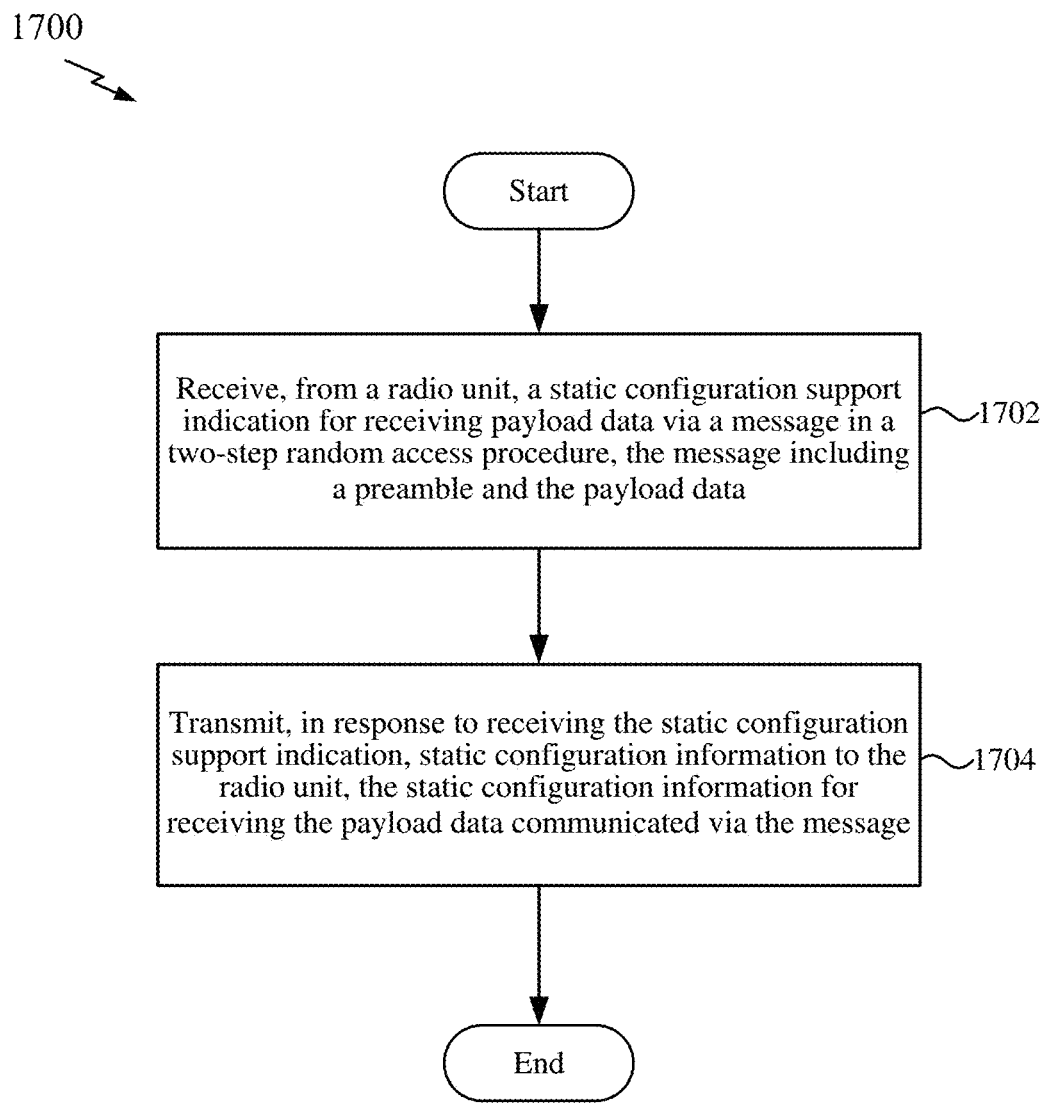
FIG. 17 is a flow chart illustrating an exemplary process for wireless communication according to some aspects.

FIG. 17 is a flow chart illustrating an exemplary process 1700 for wireless communication in a network such as an O-RAN in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the distributed unit 1600 illustrated in FIG. 16. In some examples, the process 1700 may be carried out by any suitable apparatus or means for carrying out the functions or algorithm described below.

At block 1702, the distributed unit 1600 may receive, from a radio unit, a static configuration support indication for receiving payload data via a message in a two-step random access procedure, the message including a preamble and the payload data. For example, the communication management circuitry 1640 shown and described above in connection with FIG. 16 may provide means for receiving the static configuration support indication.

At block 1704, the distributed unit 1600 may transmit, in response to receiving the static configuration support indication, static configuration information to the radio unit, the static configuration information for receiving the payload data communicated via the message. For example, the static configuration management circuitry 1642 shown and described above in connection with FIG. 16 may provide means for the static configuration information.

Figure 18:
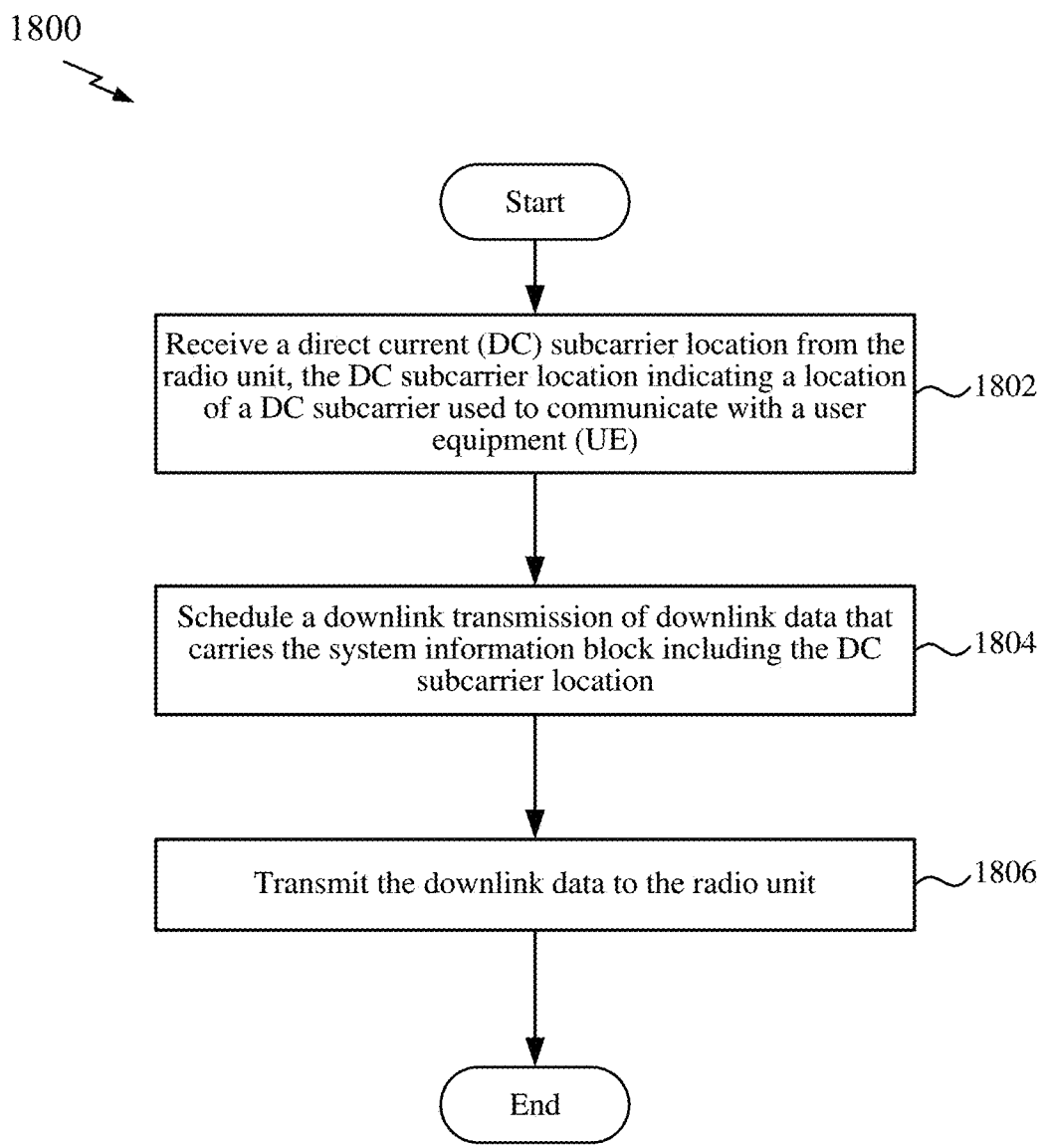
FIG. 18 is a flow chart illustrating an exemplary process for wireless communication according to some aspects.

FIG. 18 is a flow chart illustrating an exemplary process 1800 for wireless communication in a network such as an O-RAN in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the distributed unit 1600 illustrated in FIG. 16. In some examples, the process 1800 may be carried out by any suitable apparatus or means for carrying out the functions or algorithm described below.

At block 1802, the distributed unit 1600 may receive a DC subcarrier location from the radio unit, the DC subcarrier location indicating a location of a DC subcarrier used to communicate with a UE. For example, the DC subcarrier location circuitry 1644 shown and described above in connection with FIG. 16 may provide means for receiving the DC subcarrier location.

At block 1804, the distributed unit 1600 may schedule a downlink transmission of downlink data that carries a system information block including the DC subcarrier location. For example, the communication management circuitry 1640 shown and described above in connection with FIG. 16 may provide means for scheduling downlink transmission of the downlink data.

At block 1806, the distributed unit 1600 may transmit the downlink data to the radio unit. For example, the communication management circuitry 1640 shown and described above in connection with FIG. 16 may provide means for transmitting the downlink data to the radio unit.

Figure 19:
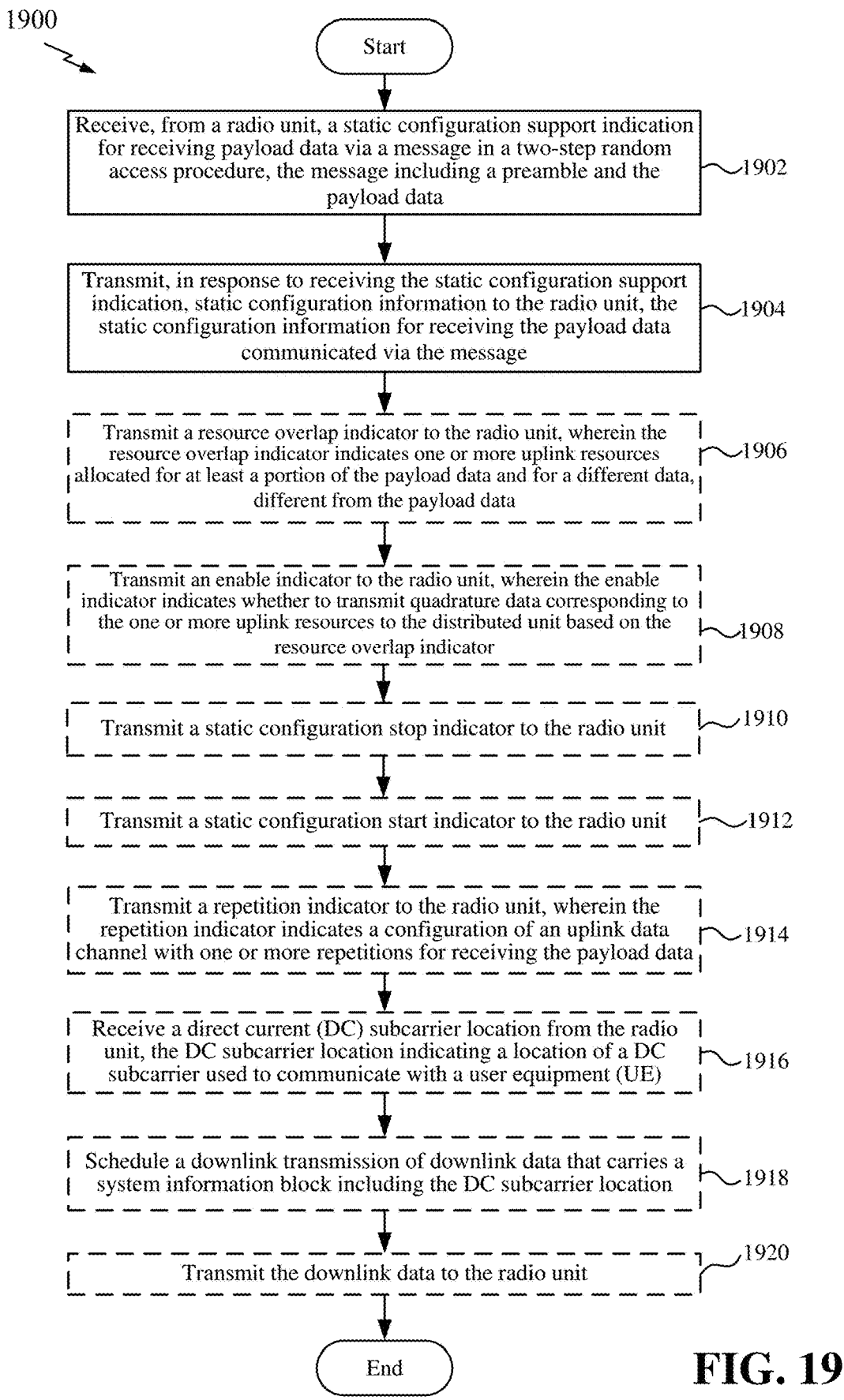
FIG. 19 is a flow chart illustrating an exemplary process for wireless communication according to some aspects.

FIG. 19 is a flow chart illustrating an exemplary process 1900 for wireless communication in a network such as an O-RAN in accordance with some aspects of the present disclosure. As described below, some or all illustrated features may be omitted in a particular implementation within the scope of the present disclosure, and some illustrated features may not be required for implementation of all embodiments. In some examples, the process 1900 may be carried out by the distributed unit 1600 illustrated in FIG. 16. In some examples, the process 1900 may be carried out by any suitable apparatus or means for carrying out the functions or algorithm described below.

At block 1902, the distributed unit 1600 may receive, from a radio unit, a static configuration support indication for receiving payload data via a message in a two-step random access procedure, the message including a preamble and the payload data. For example, the communication management circuitry 1640 shown and described above in connection with FIG. 16 may provide means for receiving the static configuration support indication. In an aspect, the payload data may be a PUSCH data. In an aspect, the two-step random access procedure may include use of a message A comprising the preamble and the payload data that includes a PUSCH data, the message A being the message, and a message B comprising a random access response and a contention resolution message.

At block 1904, the distributed unit 1600 may transmit, in response to receiving the static configuration support indication, static configuration information to the radio unit, the static configuration information for receiving the payload data communicated via the message. For example, the static configuration management circuitry 1642 shown and described above in connection with FIG. 16 may provide means for the static configuration information. In an aspect, the transmitting the static configuration information to the radio unit at block 1904 may include transmitting the static configuration information to the radio unit via an M-plane message.

In an aspect, the static configuration information for receiving the payload data may include at least one of: a frequency domain configuration for receiving the payload data, a time domain configuration for receiving the payload data, or a reference signal configuration.

In an aspect, the frequency domain configuration may include at least one of: a number of frequency-multiplexed PUSCH occasions available per time instance, a number of resource blocks by which consecutive PUSCH occasions in a frequency domain are separated, an offset value with respect to a PRB number zero or a VRB number zero, the offset value indicating a starting PRB of a PUSCH occasion or a starting VRB of the PUSCH occasion, a number of PRBs per PUSCH occasion, or an indication indicating whether to perform frequency hopping for transmission of the message along with a hopping offset.

In an aspect, the time domain configuration may include at least one of: a number of slots containing one or more PUSCH occasions with a same time domain allocation, a guard period by which consecutive PUSCH occasions in a time domain are separated, a number of contiguous time domain PUSCH occasions in each slot including the guard period, a parameter indicating a start symbol and a length corresponding to a number of consecutive symbols allocated for receiving the payload data via the message, and a PUSCH mapping type for receiving the payload data via the message, a parameter indicating the start symbol and the length corresponding to the number of consecutive symbols allocated for receiving the payload data via the message, and a reference signal mapping type, or a time offset between a start of each PRACH slot and a first PUSCH occasion slot.

In an aspect, the reference signal configuration may include a DMRS configuration including at least one of: a position for each DMRS symbol in a slot, an indicator indicating one or more DMRS resource elements in a resource block for a DMRS symbol, or a bit indicating whether one or more non-DMRS resource elements within a DMRS symbol are occupied by the payload data or not.

In an aspect, at block 1906, the distributed unit 1600 may transmit a resource overlap indicator to the radio unit, wherein the resource overlap indicator indicates one or more uplink resources allocated for at least a portion of the payload data and for a different data, different from the payload data. For example, the communication management circuitry 1640 shown and described above in connection with FIG. 16 may provide means for transmitting the resource overlap indicator.

In an aspect, at block 1908, the distributed unit 1600 may transmit an enable indicator to the radio unit, wherein the enable indicator indicates whether to transmit quadrature data corresponding to the one or more uplink resources to the distributed unit based on the resource overlap indicator. For example, the communication management circuitry 1640 shown and described above in connection with FIG. 16 may provide means for transmitting the enable indicator.

In an aspect, at block 1910, the distributed unit 1600 may transmit a static configuration stop indicator to the radio unit, the static configuration stop indicator indicating for the radio unit to stop a static configuration of the radio unit based on the static configuration information. For example, the communication management circuitry 1640 shown and described above in connection with FIG. 16 may provide means for transmitting the static configuration stop indicator to the radio unit. In an aspect, the static configuration stop indicator may include a stop duration during which the radio unit is to stop statically configuring the radio unit based on the static configuration information. In an aspect, the static configuration stop indicator may be transmitted to the radio unit via a control plane (C-plane) message.

In an aspect, at block 1912, the distributed unit 1600 may transmit a static configuration start indicator to the radio unit, the static configuration start indicator indicating for the radio unit to start a static configuration of the radio unit based on the static configuration information. For example, the communication management circuitry 1640 shown and described above in connection with FIG. 16 may provide means for transmitting the static configuration start indicator to the radio unit. In an aspect, the static configuration start indicator may include a static duration during which to statically configure the radio unit based on the static configuration information. In an aspect, the static configuration start indicator may be transmitted to the radio unit via a C-plane message.

In an aspect, at block 1914, the distributed unit 1600 may transmit a repetition indicator to the radio unit, wherein the repetition indicator indicates a configuration of an uplink data channel with one or more repetitions for receiving the payload data. For example, the communication management circuitry 1640 shown and described above in connection with FIG. 16 may provide means for transmitting the repetition indicator.

In an aspect, at block 1916, the distributed unit 1600 may receive a DC subcarrier location from the radio unit, the DC subcarrier location indicating a location of a DC subcarrier used to communicate with a UE. For example, the DC subcarrier location circuitry 1644 shown and described above in connection with FIG. 16 may provide means for receiving the DC subcarrier location. In an aspect, the receiving the DC subcarrier location from the radio unit may include receiving the DC subcarrier location from the radio unit via an M-plane message.

In an aspect, at block 1918, the distributed unit 1600 may schedule a downlink transmission of downlink data that carries a system information block including the DC subcarrier location. For example, the communication management circuitry 1640 shown and described above in connection with FIG. 16 may provide means for scheduling downlink transmission of the downlink data.

In an aspect, at block 1920, the distributed unit 1600 may transmit the downlink data to the radio unit. For example, the communication management circuitry 1640 shown and described above in connection with FIG. 16 may provide means for transmitting the downlink data to the radio unit.

In one configuration, the distributed unit 1600 for wireless communication includes means for receiving, from a radio unit, a static configuration support indication for receiving payload data via a message in a two-step random access procedure, the message including a preamble and the payload data, and means for transmitting, in response to receiving the static configuration support indication, static configuration information to the radio unit, the static configuration information for receiving the payload data communicated via the message. In an aspect, distributed unit 1600 may further include means for transmitting a resource overlap indicator to the radio unit, wherein the resource overlap indicator indicates one or more uplink resources allocated for at least a portion of the payload data and for a different data, different from the payload data, and means for transmitting an enable indicator to the radio unit, wherein the enable indicator indicates whether to transmit quadrature data corresponding to the one or more uplink resources to the distributed unit based on the resource overlap indicator. In an aspect, the distributed unit 1600 may further include means for transmitting a repetition indicator to the radio unit, wherein the repetition indicator indicates a configuration of an uplink data channel with one or more repetitions for receiving the payload data. In an aspect, the distributed unit 1600 may further include means for receiving a DC subcarrier location from the radio unit, the DC subcarrier location indicating a location of a DC subcarrier used to communicate with a UE, means for scheduling a downlink transmission of downlink data that carries a system information block including the DC subcarrier location, and means for transmitting the downlink data to the radio unit. In an aspect, the distributed unit 1600 may further include means for transmitting a static configuration stop indicator to the radio unit and/or means for transmitting a static configuration start indicator to the radio unit.

In one aspect, the aforementioned means may be the processor(s) 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 7, 8, 13, 14, and/or 15, and utilizing, for example, the processes and/or algorithms described herein in relation to FIGS. 17, 18, and/or 19.

Figure 20:
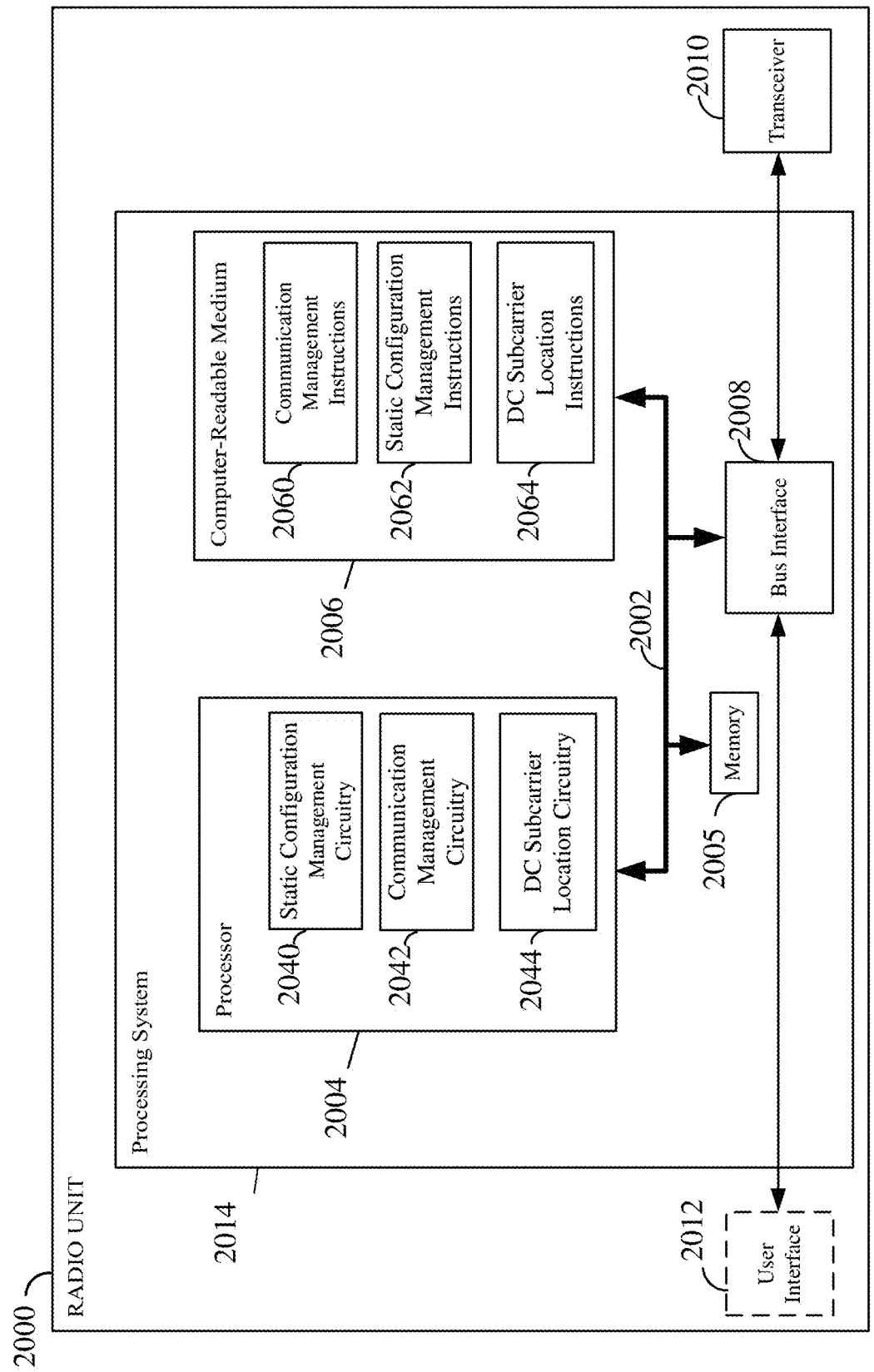
FIG. 20 is a block diagram conceptually illustrating an example of a hardware implementation for a radio unit according to some aspects.

FIG. 20 is a conceptual diagram illustrating an example of a hardware implementation for an exemplary radio unit 2000 employing a processing system 2014. In accordance with various aspects of the disclosure, an element, or any portion of an element, or any combination of elements may be implemented with a processing system 2014 that includes one or more processors 2004. For example, the radio unit 2000 may be an RU as illustrated in any one or more of FIGS. 7, 8, 13, 14, and/or 15.

The processing system 2014 may be substantially the same as the processing system 1614 illustrated in FIG. 16, including a bus interface 2008, a bus 2002, memory 2005, a processor 2004, and a computer-readable storage medium 2006. Furthermore, the radio unit 2000 may include a user interface 2012 and a transceiver 2010 substantially similar to those described above in FIG. 16. That is, the processor 2004, as utilized in a radio unit 2000, may be used to implement any one or more of the processes described below and illustrated in FIGS. 21-23.

In some aspects of the disclosure, the processor 2004 may include static configuration management circuitry 2040 configured for various functions, including, for example, transmitting, to a distributed unit, a static configuration support indication for receiving payload data via a message in a two-step random access procedure, the message including a preamble and the payload data. For example, the static configuration management circuitry 2040 may be configured to implement one or more of the functions described below in relation to FIGS. 21 and 23, including, e.g., blocks 2102 and 2302.

In some aspects, the static configuration management circuitry 2040 may be configured for various functions, including, for example, determining whether to configure the radio unit based on the static configuration information. For example, the static configuration management circuitry 2040 may be configured to implement one or more of the functions described below in relation to FIG. 23, including, e.g., block 2306.

In some aspects of the disclosure, the processor 2004 may include communication management circuitry 2042 configured for various functions, including, for example, receiving, in response to the static configuration support indication, static configuration information from the distributed unit, the static configuration information for receiving the payload data communicated via the message. For example, the communication management circuitry 2042 may be configured to implement one or more of the functions described below in relation to FIGS. 21 and 23, including, e.g., blocks 2104 and 2304.

In some aspects, the communication management circuitry 2042 may be configured for various functions, including, for example, receiving downlink data that carries a system information block including the DC subcarrier location from the distributed unit. For example, the communication management circuitry 2042 may be configured to implement one or more of the functions described below in relation to FIGS. 22 and 23, including, e.g., blocks 2204 and 2360.

In some aspects, the communication management circuitry 2042 may be configured for various functions, including, for example, transmitting the downlink data to the UE. For example, the communication management circuitry 2042 may be configured to implement one or more of the functions described below in relation to FIGS. 22 and 23, including, e.g., blocks 2206 and 2362.

In some aspects, the communication management circuitry 2042 may be configured for various functions, including, for example, receiving a repetition indicator from the distributed unit, wherein the repetition indicator indicates a configuration of an uplink data channel with one or more repetitions for receiving the payload data. For example, the communication management circuitry 2042 may be configured to implement one or more of the functions described below in relation to FIG. 23, including, e.g., block 2308.

In some aspects, the communication management circuitry 2042 may be configured for various functions, including, for example, receiving a static configuration stop indicator from the distributed unit, the static configuration stop indicator indicating for the radio unit to stop a static configuration of the radio unit based on the static configuration information. For example, the communication management circuitry 2042 may be configured to implement one or more of the functions described below in relation to FIG. 23, including, e.g., block 2310.

In some aspects, the communication management circuitry 2042 may be configured for various functions, including, for example, refraining from statically configuring the radio unit based on the static configuration information in response to the static configuration stop indicator. For example, the communication management circuitry 2042 may be configured to implement one or more of the functions described below in relation to FIG. 23, including, e.g., block 2312.

In some aspects, the communication management circuitry 2042 may be configured for various functions, including, for example, receiving a static configuration start indicator from the distributed unit, the static configuration start indicator indicating for the radio unit to start a static configuration of the radio unit based on the static configuration information. For example, the communication management circuitry 2042 may be configured to implement one or more of the functions described below in relation to FIG. 23, including, e.g., block 2314.

In some aspects, the communication management circuitry 2042 may be configured for various functions, including, for example, configuring the radio unit based on the static configuration information for receiving the payload data in response to the static configuration start indicator. For example, the communication management circuitry 2042 may be configured to implement one or more of the functions described below in relation to FIG. 23, including, e.g., block 2316.

In some aspects, the communication management circuitry 2042 may be configured for various functions, including, for example, receiving a message A comprising the preamble and the payload data that includes a PUSCH data, the message A being the message. For example, the communication management circuitry 2042 may be configured to implement one or more of the functions described below in relation to FIG. 23, including, e.g., block 2330.

In some aspects, the communication management circuitry 2042 may be configured for various functions, including, for example, receiving the payload data based on the static configuration information in response to determining to configure the radio unit based on the static configuration information. For example, the communication management circuitry 2042 may be configured to implement one or more of the functions described below in relation to FIG. 23, including, e.g., block 2332.

In some aspects, the communication management circuitry 2042 may be configured for various functions, including, for example, receiving the payload data and one or more repetitions of the payload data in response to receiving the repetition indicator. For example, the communication management circuitry 2042 may be configured to implement one or more of the functions described below in relation to FIG. 23, including, e.g., block 2334.

In some aspects, the communication management circuitry 2042 may be configured for various functions, including, for example, receiving the payload data based on a dynamic configuration for receiving the payload data in response to the static configuration stop indicator. For example, the communication management circuitry 2042 may be configured to implement one or more of the functions described below in relation to FIG. 23, including, e.g., block 2336.

In some aspects, the communication management circuitry 2042 may be configured for various functions, including, for example, transmitting a message B comprising a random access response and a contention resolution message. For example, the communication management circuitry 2042 may be configured to implement one or more of the functions described below in relation to FIG. 23, including, e.g., block 2342.

In some aspects, the communication management circuitry 2042 may be configured for various functions, including, for example, receiving a resource overlap indicator from the distributed unit, wherein the resource overlap indicator indicates one or more uplink resources allocated for at least a portion of the payload data and for a different data, different from the payload data. For example, the communication management circuitry 2042 may be configured to implement one or more of the functions described below in relation to FIG. 23, including, e.g., block 2352.

In some aspects, the communication management circuitry 2042 may be configured for various functions, including, for example, receiving, from the distributed unit, an enable indicator that indicates whether to transmit the quadrature data corresponding to the one or more uplink resources to the distributed unit based on the resource overlap indicator. For example, the communication management circuitry 2042 may be configured to implement one or more of the functions described below in relation to FIG. 23, including, e.g., block 2354.

In some aspects, the communication management circuitry 2042 may be configured for various functions, including, for example, refraining from transmitting, to the distributed unit, quadrature data corresponding to the one or more uplink resources. For example, the communication management circuitry 2042 may be configured to implement one or more of the functions described below in relation to FIG. 23, including, e.g., block 2356.

In some aspects of the disclosure, the processor 2004 may include DC subcarrier location circuitry 2044 configured for various functions, including, for example, transmitting a DC subcarrier location to the distributed unit, the DC subcarrier location indicating a location of a DC subcarrier used to communicate with a UE. For example, the DC subcarrier location circuitry 2044 may be configured to implement one or more of the functions described below in relation to FIGS. 22 and 23, including, e.g., blocks 2202 and 2358.

In some aspects of the disclosure, the computer-readable storage medium 2006 may include static configuration management software/instructions 2060 configured for various functions, including, for example, transmitting, to a distributed unit, a static configuration support indication for receiving payload data via a message in a two-step random access procedure, the message including a preamble and the payload data. For example, the static configuration management software/instructions 2060 may be configured to implement one or more of the functions described below in relation to FIGS. 21 and 23, including, e.g., blocks 2102 and 2302.

In some aspects, the static configuration management software/instructions 2060 may be configured for various functions, including, for example, determining whether to configure the radio unit based on the static configuration information. For example, the static configuration management software/instructions 2060 may be configured to implement one or more of the functions described below in relation to FIG. 23, including, e.g., block 2306.

In some aspects of the disclosure, the computer-readable storage medium 2006 may include communication management software/instructions 2062 configured for various functions, including, for example, receiving, in response to the static configuration support indication, static configuration information from the distributed unit, the static configuration information for receiving the payload data communicated via the message. For example, the communication management software/instructions 2062 may be configured to implement one or more of the functions described below in relation to FIGS. 21 and 23, including, e.g., blocks 2104 and 2304.

In some aspects, the communication management software/instructions 2062 may be configured for various functions, including, for example, receiving a repetition indicator from the distributed unit, wherein the repetition indicator indicates a configuration of an uplink data channel with one or more repetitions for receiving the payload data. For example, the communication management software/instructions 2062 may be configured to implement one or more of the functions described below in relation to FIG. 23, including, e.g., block 2308.

In some aspects, the communication management software/instructions 2062 may be configured for various functions, including, for example, receiving a static configuration stop indicator from the distributed unit, the static configuration stop indicator indicating for the radio unit to stop a static configuration of the radio unit based on the static configuration information. For example, the communication management software/instructions 2062 may be configured to implement one or more of the functions described below in relation to FIG. 23, including, e.g., block 2310.

In some aspects, the communication management software/instructions 2062 may be configured for various functions, including, for example, refraining from statically configuring the radio unit based on the static configuration information in response to the static configuration stop indicator. For example, the communication management software/instructions 2062 may be configured to implement one or more of the functions described below in relation to FIG. 23, including, e.g., block 2312.

In some aspects, the communication management software/instructions 2062 may be configured for various functions, including, for example, receiving a static configuration start indicator from the distributed unit, the static configuration start indicator indicating for the radio unit to start a static configuration of the radio unit based on the static configuration information. For example, the communication management software/instructions 2062 may be configured to implement one or more of the functions described below in relation to FIG. 23, including, e.g., block 2314.

In some aspects, the communication management software/instructions 2062 may be configured for various functions, including, for example, configuring the radio unit based on the static configuration information for receiving the payload data in response to the static configuration start indicator. For example, the communication management software/instructions 2062 may be configured to implement one or more of the functions described below in relation to FIG. 23, including, e.g., block 2316.

In some aspects, the communication management software/instructions 2062 may be configured for various functions, including, for example, receiving a message A comprising the preamble and the payload data that includes a PUSCH data, the message A being the message. For example, the communication management software/instructions 2062 may be configured to implement one or more of the functions described below in relation to FIG. 23, including, e.g., block 2330.

In some aspects, the communication management software/instructions 2062 may be configured for various functions, including, for example, receiving the payload data based on the static configuration information in response to determining to configure the radio unit based on the static configuration information. For example, the communication management software/instructions 2062 may be configured to implement one or more of the functions described below in relation to FIG. 23, including, e.g., block 2332.

In some aspects, the communication management software/instructions 2062 may be configured for various functions, including, for example, receiving the payload data and one or more repetitions of the payload data in response to receiving the repetition indicator. For example, the communication management software/instructions 2062 may be configured to implement one or more of the functions described below in relation to FIG. 23, including, e.g., block 2334.

In some aspects, the communication management software/instructions 2062 may be configured for various functions, including, for example, receiving the payload data based on a dynamic configuration for receiving the payload data in response to the static configuration stop indicator. For example, the communication management software/instructions 2062 may be configured to implement one or more of the functions described below in relation to FIG. 23, including, e.g., block 2336.

In some aspects, the communication management software/instructions 2062 may be configured for various functions, including, for example, transmitting a message B comprising a random access response and a contention resolution message. For example, the communication management software/instructions 2062 may be configured to implement one or more of the functions described below in relation to FIG. 23, including, e.g., block 2342.

In some aspects, the communication management software/instructions 2062 may be configured for various functions, including, for example, receiving a resource overlap indicator from the distributed unit, wherein the resource overlap indicator indicates one or more uplink resources allocated for at least a portion of the payload data and for a different data, different from the payload data. For example, the communication management software/instructions 2062 may be configured to implement one or more of the functions described below in relation to FIG. 23, including, e.g., block 2352.

In some aspects, the communication management software/instructions 2062 may be configured for various functions, including, for example, receiving, from the distributed unit, an enable indicator that indicates whether to transmit the quadrature data corresponding to the one or more uplink resources to the distributed unit based on the resource overlap indicator. For example, the communication management software/instructions 2062 may be configured to implement one or more of the functions described below in relation to FIG. 23, including, e.g., block 2354.

In some aspects, the communication management software/instructions 2062 may be configured for various functions, including, for example, refraining from transmitting, to the distributed unit, quadrature data corresponding to the one or more uplink resources. For example, the communication management software/instructions 2062 may be configured to implement one or more of the functions described below in relation to FIG. 23, including, e.g., block 2356.

In some aspects of the disclosure, the computer-readable storage medium 2006 may include DC subcarrier location software/instructions 2064 configured for various functions, including, for example, transmitting a DC subcarrier location to the distributed unit, the DC subcarrier location indicating a location of a DC subcarrier used to communicate with a UE. For example, the DC subcarrier location software/instructions 2064 may be configured to implement one or more of the functions described below in relation to FIGS. 22 and 23, including, e.g., blocks 2202 and 2358.

Figure 21:
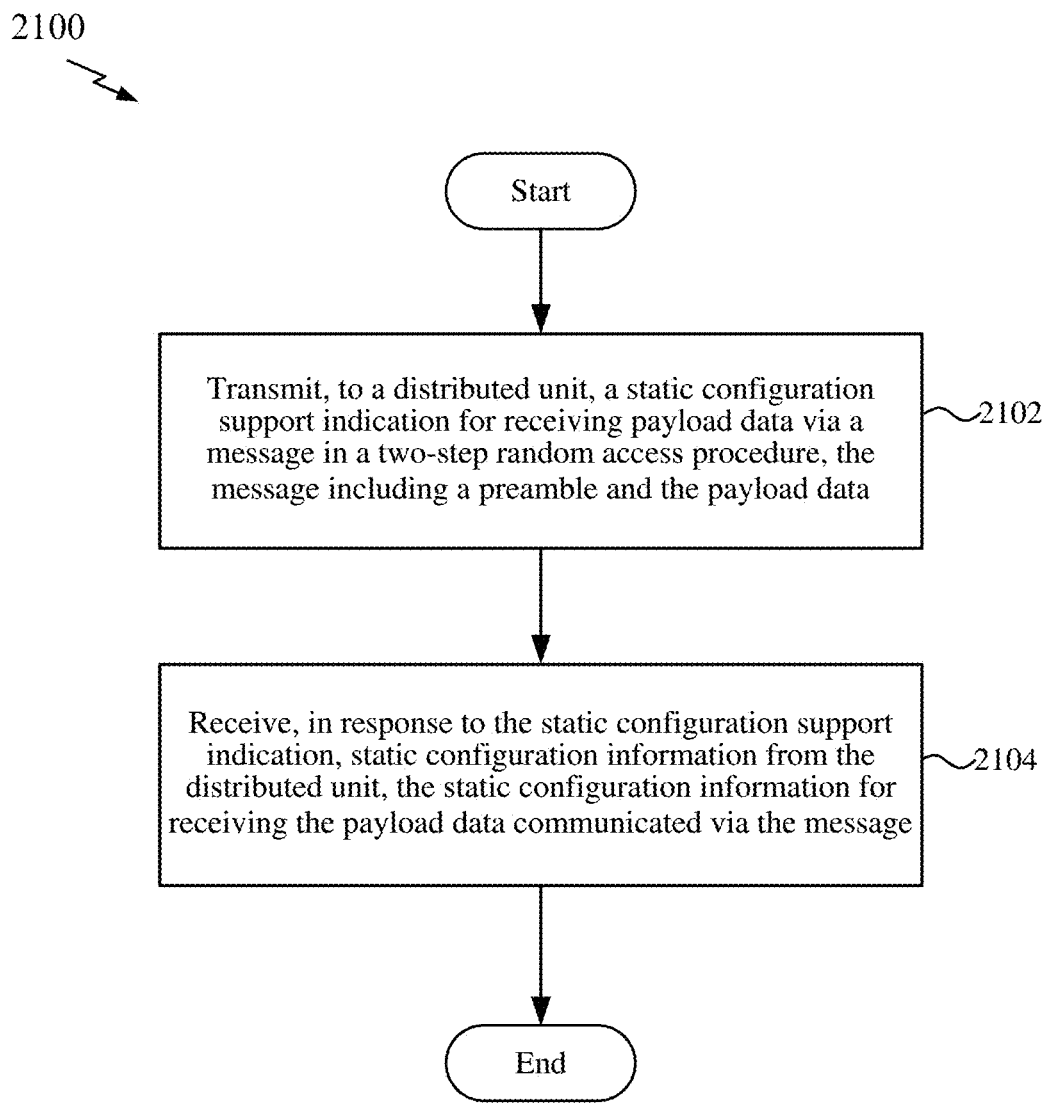
FIG. 21 is a flow chart illustrating an exemplary process for wireless communication according to some aspects.

FIG. 21 is a flow chart illustrating an exemplary process 2100 for wireless communication in a network such as an O-RAN in accordance with some aspects of the present disclosure. As described below, some or all illustrated features may be omitted in a particular implementation within the scope of the present disclosure, and some illustrated features may not be required for implementation of all embodiments. In some examples, the process 2100 may be carried out by the radio unit 2000 illustrated in FIG. 20. In some examples, the process 2100 may be carried out by any suitable apparatus or means for carrying out the functions or algorithm described below.

At block 2102, the radio unit 2000 may transmit, to a distributed unit, a static configuration support indication for receiving payload data via a message in a two-step random access procedure, the message including a preamble and the payload data. For example, the static configuration management circuitry 2040 shown and described above in connection with FIG. 20 may provide means for transmitting the static configuration support indication.

At block 2104, the radio unit 2000 may receive, in response to the static configuration support indication, static configuration information from the distributed unit, the static configuration information for receiving the payload data communicated via the message. For example, the communication management circuitry 2042 shown and described above in connection with FIG. 20 may provide means for receiving the static configuration information.

Figure 22:
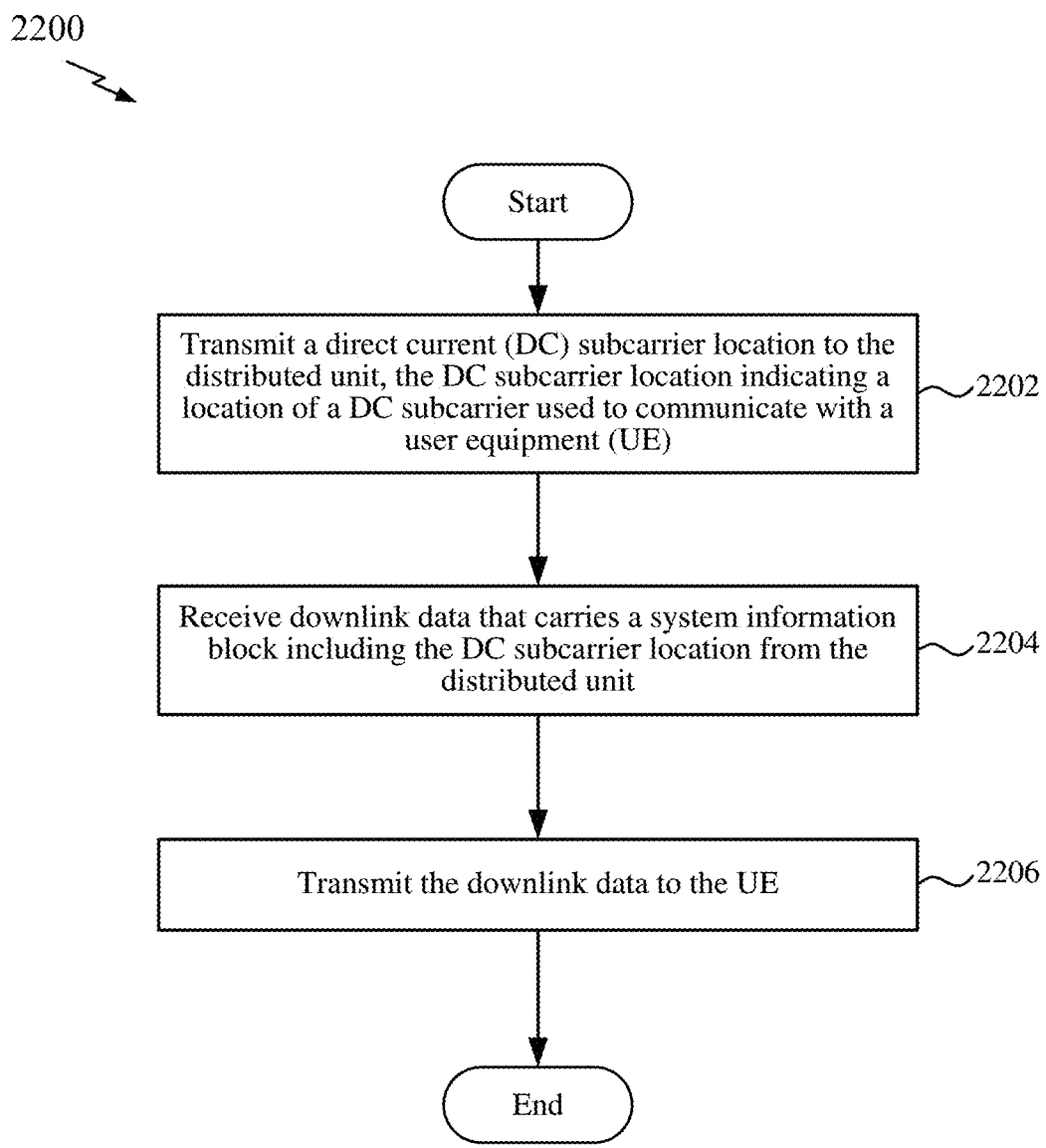
FIG. 22 is a flow chart illustrating an exemplary process for wireless communication according to some aspects.

FIG. 22 is a flow chart illustrating an exemplary process 2200 for wireless communication in a network such as an O-RAN in accordance with some aspects of the present disclosure. As described below, some or all illustrated features may be omitted in a particular implementation within the scope of the present disclosure, and some illustrated features may not be required for implementation of all embodiments. In some examples, the process 2200 may be carried out by the radio unit 2000 illustrated in FIG. 20. In some examples, the process 2200 may be carried out by any suitable apparatus or means for carrying out the functions or algorithm described below.

At block 2202, the radio unit 2000 may transmit a DC subcarrier location to the distributed unit, the DC subcarrier location indicating a location of a DC subcarrier used to communicate with a UE. For example, the DC subcarrier location circuitry 2044 shown and described above in connection with FIG. 20 may provide means for transmitting the DC subcarrier location.

At block 2204, the radio unit 2000 may receive downlink data that carries a system information block including the DC subcarrier location from the distributed unit. For example, the communication management circuitry 2042 shown and described above in connection with FIG. 20 may provide means for receiving the downlink data.

At block 2296, the radio unit 2000 may transmit the downlink data to the UE. For example, the communication management circuitry 2042 shown and described above in connection with FIG. 20 may provide means for transmitting the downlink data.

Figure 23A:
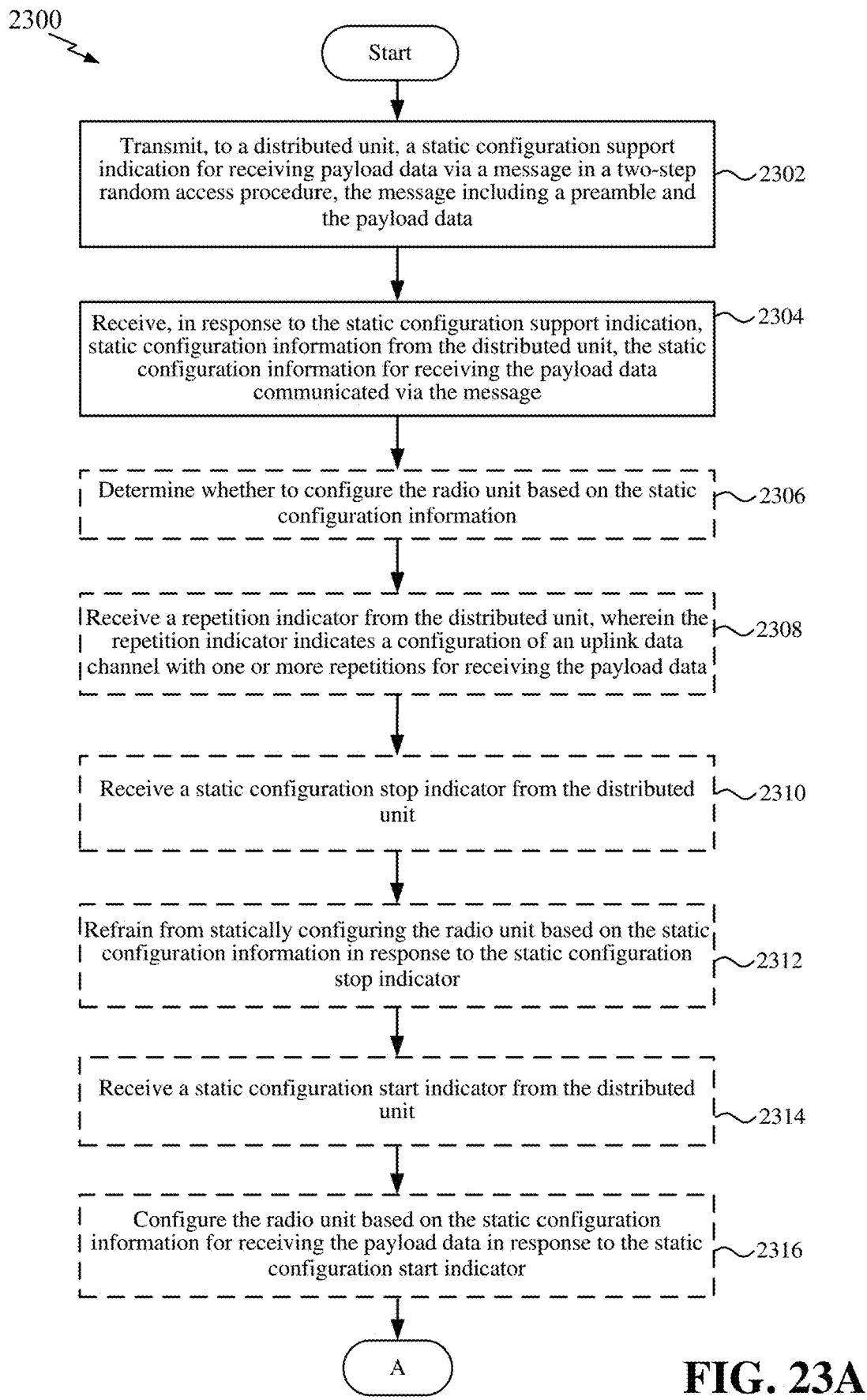
FIG. 23 (23A, 23B, 23C) is a flow chart illustrating an exemplary process for wireless communication according to some aspects.

FIG. 23A is a flow chart illustrating an exemplary process 2300 for wireless communication in a network such as an O-RAN in accordance with some aspects of the present disclosure. As described below, some or all illustrated features may be omitted in a particular implementation within the scope of the present disclosure, and some illustrated features may not be required for implementation of all embodiments. In some examples, the process 2300 may be carried out by the radio unit 2000 illustrated in FIG. 20. In some examples, the process 2300 may be carried out by any suitable apparatus or means for carrying out the functions or algorithm described below.

At block 2302, the radio unit 2000 may transmit, to a distributed unit, a static configuration support indication for receiving payload data via a message in a two-step random access procedure, the message including a preamble and the payload data. For example, the static configuration management circuitry 2040 shown and described above in connection with FIG. 20 may provide means for transmitting the static configuration support indication. In an aspect, the payload data may be a PUSCH data.

At block 2304, the radio unit 2000 may receive, in response to the static configuration support indication, static configuration information from the distributed unit, the static configuration information for receiving the payload data communicated via the message. For example, the communication management circuitry 2042 shown and described above in connection with FIG. 20 may provide means for receiving the static configuration information. In an aspect, the receiving the static configuration information from the distributed unit at block 2304 may include receiving the static configuration information from the distributed unit via an M-plane message.

In an aspect, the static configuration information for receiving the payload data may include at least one of: a frequency domain configuration for receiving the payload data, a time domain configuration for receiving the payload data, or a reference signal configuration.

In an aspect, the frequency domain configuration may include at least one of: a number of frequency-multiplexed PUSCH occasions available per time instance, a number of resource blocks by which consecutive PUSCH occasions in a frequency domain are separated, an offset value with respect to a PRB number zero or a VRB number zero, the offset value indicating a starting PRB of a PUSCH occasion or a starting VRB of the PUSCH occasion, a number of PRBs per PUSCH occasion, or an indication indicating whether to perform frequency hopping for transmission of the message along with a hopping offset.

In an aspect, the time domain configuration may include at least one of: a number of slots containing one or more PUSCH occasions with a same time domain allocation, a guard period by which consecutive PUSCH occasions in a time domain are separated, a number of contiguous time domain PUSCH occasions in each slot including the guard period, a parameter indicating a start symbol and a length corresponding to a number of consecutive symbols allocated for receiving the payload data via the message, and a PUSCH mapping type for receiving the payload data via the message, a parameter indicating the start symbol and the length corresponding to the number of consecutive symbols allocated for receiving the payload data via the message, and a reference signal mapping type, or a time offset between a start of each PRACH slot and a first PUSCH occasion slot.

In an aspect, the reference signal configuration may include a DMRS configuration including at least one of: a position for each DMRS symbol in a slot, an indicator indicating one or more DMRS resource elements in a resource block for a DMRS symbol, or a bit indicating whether one or more non-DMRS resource elements within a DMRS symbol are occupied by the payload data or not.

In an aspect, at block 2306, the radio unit 2000 may determine whether to configure the radio unit 2000 based on the static configuration information. For example, the static configuration management circuitry 2040 shown and described above in connection with FIG. 20 may provide means for determining whether to configure the radio unit 2000 based on the static configuration information.

In an aspect, at block 2308, the radio unit 2000 may receive a repetition indicator from the distributed unit, wherein the repetition indicator indicates a configuration of an uplink data channel with one or more repetitions for receiving the payload data. For example, the communication management circuitry 2042 shown and described above in connection with FIG. 20 may provide means for receiving the repetition indicator.

In an aspect, at block 2310, the radio unit 2000 may receive a static configuration stop indicator from the distributed unit, the static configuration stop indicator indicating for the radio unit 2000 to stop a static configuration of the radio unit 2000 based on the static configuration information. For example, the communication management circuitry 2042 shown and described above in connection with FIG. 20 may provide means for receiving the static configuration stop indicator.

In an aspect, at block 2312, the radio unit 2000 may refrain from statically configuring the radio unit 2000 based on the static configuration information in response to the static configuration stop indicator. For example, the communication management circuitry 2042 shown and described above in connection with FIG. 20 may provide means for refrain from statically configuring the radio unit 2000 based on the static configuration information. In an aspect, the static configuration stop indicator may include a stop duration during which the radio unit 2000 is to stop statically configuring the radio unit 2000 based on the static configuration information, and the refraining from statically configuring the radio unit 2000 based on the static configuration at block 2312 may include refraining from statically configuring the radio unit 2000 based on the static configuration for the stop duration. In an aspect, the static configuration stop indicator may be received from the distributed unit via a C-plane message.

In an aspect, at block 2314, the radio unit 2000 may receive a static configuration start indicator from the distributed unit, the static configuration start indicator indicating for the radio unit 2000 to start a static configuration of the radio unit 2000 based on the static configuration information. For example, the communication management circuitry 2042 shown and described above in connection with FIG. 20 may provide means for receiving the static configuration start indicator.

In an aspect, at block 2316, the radio unit 2000 may configure the radio unit 2000 based on the static configuration information for receiving the payload data in response to the static configuration start indicator. For example, the communication management circuitry 2042 shown and described above in connection with FIG. 20 may provide means for configuring the radio unit 2000 based on the static configuration information. In an aspect, the static configuration start indicator may include a static duration during which the radio unit 2000 is to statically configure the radio unit based on the static configuration information, and the configuring the radio unit 2000 based on the static configuration information for receiving the payload data at block 2316 may include configuring the radio unit 2000 based on the static configuration information for receiving the payload data for the static duration. In an aspect, the static configuration start indicator may be received from the distributed unit via a C-plane message.

Figure 23B:
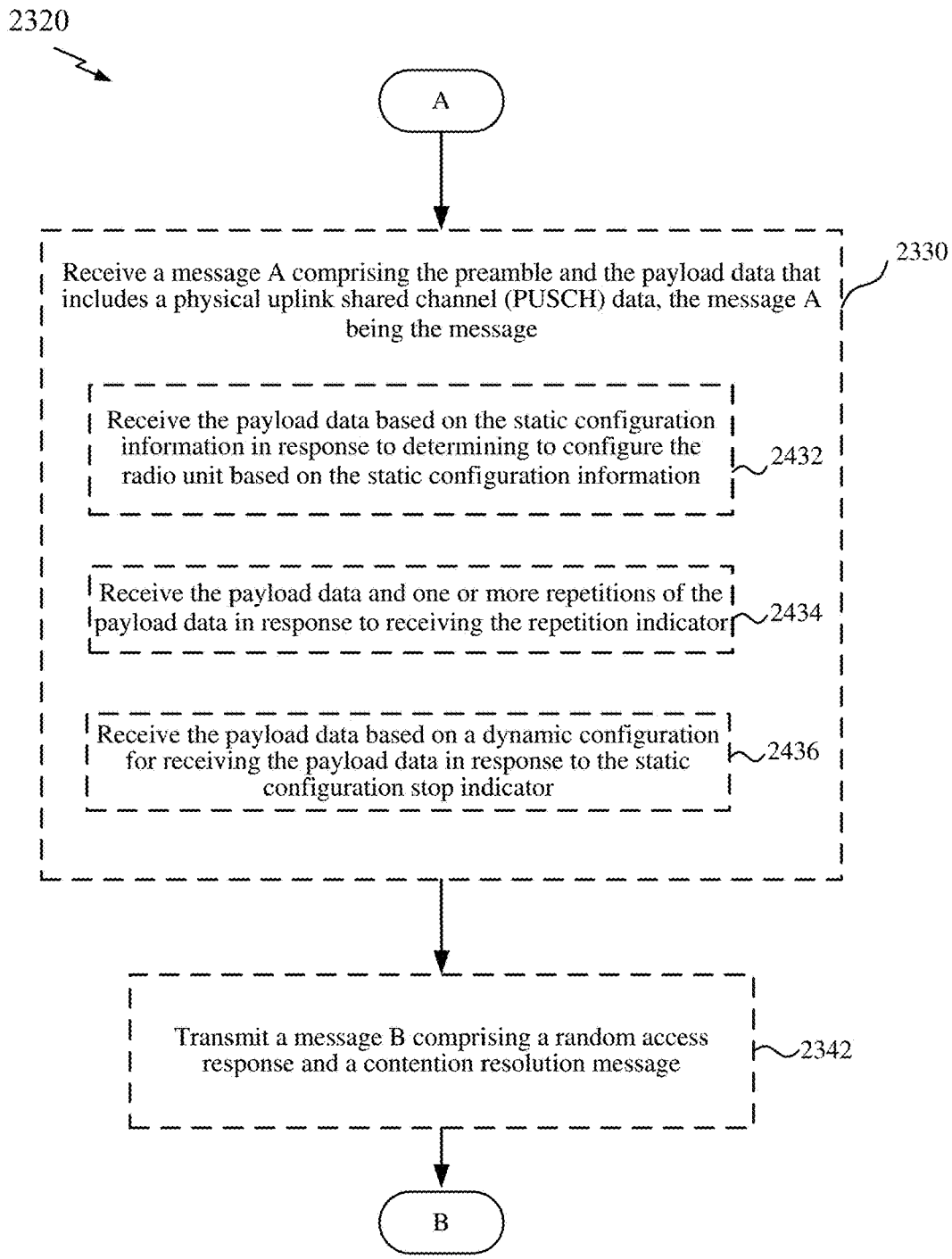

FIG. 23B is a flow chart illustrating an exemplary process 2320 for wireless communication, continuing from the flow chart of FIG. 23A, in accordance with some aspects of the present disclosure. As described below, some or all illustrated features may be omitted in a particular implementation within the scope of the present disclosure, and some illustrated features may not be required for implementation of all embodiments. In some examples, the process 2320 may be carried out by the radio unit 2000 illustrated in FIG. 20. In some examples, the process 2320 may be carried out by any suitable apparatus or means for carrying out the functions or algorithm described below.

In an aspect, at block 2330, the radio unit 2000 may receive a message A comprising the preamble and the payload data that includes a PUSCH data, the message A being the message. For example, the communication management circuitry 2042 shown and described above in connection with FIG. 20 may provide means for receiving the message A.

In an aspect, at block 2332, when the radio unit 2000 receives the message A, the radio unit 2000 may receive the payload data based on the static configuration information in response to determining to configure the radio unit 2000 based on the static configuration information. For example, the communication management circuitry 2042 shown and described above in connection with FIG. 20 may provide means for receiving the payload data.

In an aspect, at block 2334, when the radio unit 2000 receives the message A, the radio unit 2000 may receive the payload data and one or more repetitions of the payload data in response to receiving the repetition indicator. For example, the communication management circuitry 2042 shown and described above in connection with FIG. 20 may provide means for receiving the payload data and the one or more repetitions of the payload data.

In an aspect, at block 2336, when the radio unit 2000 receives the message A, the radio unit 2000 may receive the payload data based on a dynamic configuration for receiving the payload data in response to the static configuration stop indicator. For example, the communication management circuitry 2042 shown and described above in connection with FIG. 20 may provide means for receiving receive the payload data based on the dynamic configuration.

In an aspect, at block 2342, the radio unit 2000 may transmit a message B comprising a random access response and a contention resolution message. For example, the communication management circuitry 2042 shown and described above in connection with FIG. 20 may provide means for transmitting the message B.

FIG. 23C is a flow chart illustrating an exemplary process 2350 for wireless communication, continuing from the flow chart of FIG. 23B, in accordance with some aspects of the present disclosure. As described below, some or all illustrated features may be omitted in a particular implementation within the scope of the present disclosure, and some illustrated features may not be required for implementation of all embodiments. In some examples, the process 2350 may be carried out by the radio unit 2000 illustrated in FIG. 20. In some examples, the process 2350 may be carried out by any suitable apparatus or means for carrying out the functions or algorithm described below.

In an aspect, at block 2352, the radio unit 2000 may receive a resource overlap indicator from the distributed unit, wherein the resource overlap indicator indicates one or more uplink resources allocated for at least a portion of the payload data and for a different data, different from the payload data. For example, the communication management circuitry 2042 shown and described above in connection with FIG. 20 may provide means for receiving resource overlap indicator.

In an aspect, at block 2354, the radio unit 2000 may receive, from the distributed unit, an enable indicator that indicates whether to transmit the quadrature data corresponding to the one or more uplink resources to the distributed unit based on the resource overlap indicator. For example, the communication management circuitry 2042 shown and described above in connection with FIG. 20 may provide means for receiving the enable indicator.

In an aspect, at block 2356, the radio unit 2000 may refrain from transmitting, to the distributed unit, quadrature data corresponding to the one or more uplink resources. For example, the communication management circuitry 2042 shown and described above in connection with FIG. 20 may provide means for refraining from transmitting the quadrature data.

At block 2358, the radio unit 2000 may transmit a DC subcarrier location to the distributed unit, the DC subcarrier location indicating a location of a DC subcarrier used to communicate with a UE. For example, the DC subcarrier location circuitry 2044 shown and described above in connection with FIG. 20 may provide means for transmitting the DC subcarrier location. In an aspect, the transmitting the DC subcarrier location to the distributed unit may include transmitting the DC subcarrier location to the distributed unit via an M-plane message.

At block 2360, the radio unit 2000 may receive downlink data that carries a system information block including the DC subcarrier location from the distributed unit. For example, the communication management circuitry 2042 shown and described above in connection with FIG. 20 may provide means for receiving the downlink data.

At block 2362, the radio unit 2000 may transmit the downlink data to the UE. For example, the communication management circuitry 2042 shown and described above in connection with FIG. 20 may provide means for transmitting the downlink data.

In one configuration, the radio unit 2000 for wireless communication includes means for transmitting, to a distributed unit, a static configuration support indication for receiving payload data via a message in a two-step random access procedure, the message including a preamble and the payload data, and means for receiving, in response to the static configuration support indication, static configuration information from the distributed unit, the static configuration information for receiving the payload data communicated via the message. In an aspect, the radio unit 2000 may further include means for determining whether to configure the radio unit 2000 based on the static configuration information and means for receiving the payload data based on the static configuration information in response to determining to configure the radio unit 2000 based on the static configuration information.

In an aspect, the radio unit 2000 may further include means for receiving a resource overlap indicator from the distributed unit, wherein the resource overlap indicator indicates one or more uplink resources allocated for at least a portion of the payload data and for a different data, different from the payload data, and means for refraining from transmitting, to the distributed unit, quadrature data corresponding to the one or more uplink resources. In an aspect, the radio unit 2000 may further include means for receiving, from the distributed unit, an enable indicator that indicates whether to transmit the quadrature data corresponding to the one or more uplink resources to the distributed unit based on the resource overlap indicator. In an aspect, the radio unit 2000 may further include means for receiving a repetition indicator from the distributed unit, wherein the repetition indicator indicates a configuration of an uplink data channel with one or more repetitions for receiving the payload data, and means for receiving the payload data and one or more repetitions of the payload data in response to receiving the repetition indicator. In an aspect, the radio unit 2000 may further include means for receiving a static configuration stop indicator from the distributed unit, the static configuration stop indicator indicating for the radio unit 2000 to stop a static configuration of the radio unit 2000 based on the static configuration information and means for refraining from statically configuring the radio unit 2000 based on the static configuration information in response to the static configuration stop indicator. In an aspect, the radio unit 2000 may further include means for receiving a static configuration start indicator from the distributed unit, the static configuration start indicator indicating for the radio unit 2000 to start a static configuration of the radio unit 2000 based on the static configuration information, and means for configuring the radio unit 2000 based on the static configuration information for receiving the payload data in response to the static configuration start indicator, In an aspect, the radio unit 2000 may further include means for receiving a message A comprising the preamble and the payload data that includes a PUSCH data, the message A being the message, and means for transmitting a message B comprising a random access response and a contention resolution message. In an aspect, the radio unit 2000 may further include means for receiving the payload data based on a dynamic configuration for receiving the payload data in response to the static configuration stop indicator, In an aspect, the radio unit 2000 may further include means for transmitting a DC subcarrier location to the distributed unit, the DC subcarrier location indicating a location of a DC subcarrier used to communicate with a UE, means for receiving downlink data that carries a system information block including the DC subcarrier location from the distributed unit, and means for transmitting the downlink data to the UE.

In one aspect, the aforementioned means may be the processor(s) 2004 shown in FIG. 20 configured to perform the functions recited by the aforementioned means. In another aspect, the aforementioned means may be a circuit or any apparatus configured to perform the functions recited by the aforementioned means.

Of course, in the above examples, the circuitry included in the processor 2004 is merely provided as an example, and other means for carrying out the described functions may be included within various aspects of the present disclosure, including but not limited to the instructions stored in the computer-readable storage medium 2006, or any other suitable apparatus or means described in any one of the FIGS. 7, 8, 13, 14, and/or 15, and utilizing, for example, the processes and/or algorithms described herein in relation to FIGS. 21, 22, and/or 23.

The following provides an overview of several aspects of the present disclosure.

Aspect 1: A method of configuring wireless communication by a distributed unit in a network node, comprising: receiving, from a radio unit, a static configuration support indication for receiving payload data via a message in a two-step random access procedure, the message including a preamble and the payload data; and transmitting, in response to receiving the static configuration support indication, static configuration information to the radio unit, the static configuration information for receiving the payload data communicated via the message.

Aspect 2: The method of aspect 1, wherein the static configuration information for receiving the payload data includes at least one of: a frequency domain configuration for receiving the payload data, a time domain configuration for receiving the payload data, or a reference signal configuration.

Aspect 3: The method of aspect 2, wherein the frequency domain configuration includes at least one of: a number of frequency-multiplexed physical uplink shared channel (PUSCH) occasions available per time instance, a number of resource blocks by which consecutive PUSCH occasions in a frequency domain are separated, an offset value with respect to a physical resource block (PRB) number zero or a virtual resource block (VRB) number zero, the offset value indicating a starting PRB of a PUSCH occasion or a starting VRB of the PUSCH occasion, a number of PRBs per PUSCH occasion, or an indication indicating whether to perform frequency hopping for transmission of the message along with a hopping offset.

Aspect 4: The method of aspect 2 or 3, wherein the time domain configuration includes at least one of: a number of slots containing one or more physical uplink shared channel (PUSCH) occasions with a same time domain allocation, a guard period by which consecutive PUSCH occasions in a time domain are separated, a number of contiguous time domain PUSCH occasions in each slot including the guard period, a parameter indicating a start symbol and a length corresponding to a number of consecutive symbols allocated for receiving the payload data via the message, and a PUSCH mapping type for receiving the payload data via the message, a parameter indicating the start symbol and the length corresponding to the number of consecutive symbols allocated for receiving the payload data via the message, and a reference signal mapping type, or a time offset between a start of each physical random access channel (PRACH) slot and a first PUSCH occasion slot.

Aspect 5: The method of any one of aspects 2 through 4, wherein the reference signal configuration includes a demodulation reference signal (DMRS) configuration including at least one of: a position for each DMRS symbol in a slot, an indicator indicating one or more DMRS resource elements in a resource block for a DMRS symbol, or a bit indicating whether one or more non-DMRS resource elements within a DMRS symbol are occupied by the payload data or not.

Aspect 6: The method of any one of aspects 1 through 5, further comprising: transmitting a resource overlap indicator to the radio unit, wherein the resource overlap indicator indicates one or more uplink resources allocated for at least a portion of the payload data and for a different data, different from the payload data.

Aspect 7: The method of aspect 6, further comprising: transmitting an enable indicator to the radio unit, wherein the enable indicator indicates whether to transmit quadrature data corresponding to the one or more uplink resources to the distributed unit based on the resource overlap indicator.

Aspect 8: The method of any one of aspects 1 through 7, further comprising: transmitting a repetition indicator to the radio unit, wherein the repetition indicator indicates a configuration of an uplink data channel with one or more repetitions for receiving the payload data.

Aspect 9: The method of any one of aspects 1 through 8, wherein the payload data is a physical uplink shared channel (PUSCH) data.

Aspect 10: The method of any one of aspects 1 through 9, wherein the two-step random access procedure comprises use of a message A comprising the preamble and the payload data that includes a physical uplink shared channel (PUSCH) data, the message A being the message, and a message B comprising a random access response and a contention resolution message.

Aspect 11: The method of any one of aspects 1 through 10, wherein the transmitting the static configuration information to the radio unit comprises transmitting the static configuration information to the radio unit via a management plane (M-plane) message.

Aspect 12: The method of any one of aspects 1 through 11, further comprising: receiving a direct current (DC) subcarrier location from the radio unit, the DC subcarrier location indicating a location of a DC subcarrier used to communicate with a user equipment (UE); scheduling a downlink transmission of downlink data that carries a system information block including the DC subcarrier location; and transmitting the downlink data to the radio unit.

Aspect 13: The method of aspect 12, wherein the receiving the DC subcarrier location from the radio unit comprises receiving the DC subcarrier location from the radio unit via a management plane (M-plane) message.

Aspect 14: The method of any one of aspects 1 through 13, further comprising: transmitting a static configuration stop indicator to the radio unit, the static configuration stop indicator indicating for the radio unit to stop a static configuration of the radio unit based on the static configuration information.

Aspect 15: The method of aspect 14, wherein the static configuration stop indicator includes a stop duration during which the radio unit is to stop statically configuring the radio unit based on the static configuration information.

Aspect 16: The method of aspect 14 or 15, wherein the static configuration stop indicator is transmitted to the radio unit via a control plane (C-plane) message.

Aspect 17: The method of any one of aspects 1 through 16, further comprising: transmitting a static configuration start indicator to the radio unit, the static configuration start indicator indicating for the radio unit to start a static configuration of the radio unit based on the static configuration information.

Aspect 18: The method of aspect 17, wherein the static configuration start indicator includes a static duration during which the radio unit is to statically configure the radio unit based on the static configuration information.

Aspect 19: The method of aspect 17 or 18, wherein the static configuration start indicator is transmitted to the radio unit via a control plane (C-plane) message.

Aspect 20: A distributed unit in a network node, the distributed unit comprising: a transceiver configured to communicate with a radio access network, a memory, and a processor communicatively coupled to the transceiver and the memory, wherein the processor is configured to perform any one of aspects 1 through 19.

Aspect 21: A distributed unit in a network node, the distributed unit configured for wireless communication comprising at least one means for performing any one of aspects 1 through 19.

Aspect 22: A non-transitory processor-readable storage medium having instructions for a distributed unit thereon in a network node, wherein the instructions, when executed by a processing circuit, cause the processing circuit to perform any one of aspects 1 through 19.

Aspect 23: A method of configuring a wireless communication by a radio unit, comprising: transmitting, to a distributed unit, a static configuration support indication for receiving payload data via a message in a two-step random access procedure, the message including a preamble and the payload data; and receiving, in response to the static configuration support indication, static configuration information from the distributed unit, the static configuration information for receiving the payload data communicated via the message.

Aspect 24: The method of aspect 23, further comprising: determining whether to configure the radio unit based on the static configuration information; and receiving the payload data based on the static configuration information in response to determining to configure the radio unit based on the static configuration information.

Aspect 25: The method of aspect 23 or 24, wherein the static configuration information for receiving the payload data includes at least one of: a frequency domain configuration for receiving the payload data, a time domain configuration for receiving the payload data, or a reference signal configuration.

Aspect 26: The method of aspect 25, wherein the frequency domain configuration includes at least one of: a number of frequency-multiplexed physical uplink shared channel (PUSCH) occasions available per time instance, a number of resource blocks by which consecutive PUSCH occasions in a frequency domain are separated, an offset value with respect to a physical resource block (PRB) number zero or a virtual resource block (VRB) number zero, the offset value indicating a starting PRB of a PUSCH occasion or a starting VRB of the PUSCH occasion, a number of PRBs per PUSCH occasion, or an indication indicating whether to perform frequency hopping for transmission of the message along with a hopping offset.

Aspect 27: The method of aspect 25 or 26, wherein the time domain configuration includes at least one of: a number of slots containing one or more physical uplink shared channel (PUSCH) occasions with a same time domain allocation, a guard period by which consecutive PUSCH occasions in a time domain are separated, a number of contiguous time domain PUSCH occasions in each slot including the guard period, a parameter indicating a start symbol and a length corresponding to a number of consecutive symbols allocated for receiving the payload data via the message, and a PUSCH mapping type for receiving the payload data via the message, a parameter indicating the start symbol and the length corresponding to the number of consecutive symbols allocated for receiving the payload data via the message, and a reference signal mapping type, or a time offset between a start of each physical random access channel (PRACH) slot and a first PUSCH occasion slot.

Aspect 28: The method of any one of aspects 25 through 27, wherein the reference signal configuration includes a demodulation reference signal (DMRS) configuration including at least one of: a position for each DMRS symbol in a slot, an indicator indicating one or more DMRS resource elements in a resource block for the DMRS symbol, or a bit indicating whether one or more non-DMRS resource elements within a DMRS symbol are occupied by the payload data or not.

Aspect 29: The method of any one of aspects 23 through 28, further comprising: receiving a resource overlap indicator from the distributed unit, wherein the resource overlap indicator indicates one or more uplink resources allocated for at least a portion of the payload data and for a different data or a reference signal different from the payload data; and refraining from transmitting, to the distributed unit, quadrature data corresponding to the one or more uplink resources.

Aspect 30: The method of aspect 29, further comprising: receiving, from the distributed unit, an enable indicator that indicates whether to transmit the quadrature data corresponding to the one or more uplink resources to the distributed unit based on the resource overlap indicator, wherein the refraining from transmitting the quadrature data corresponding to the one or more uplink resources comprises refraining from transmitting the quadrature data corresponding to the one or more uplink resources in response to receiving the enable indicator indicating not to transmit the quadrature data corresponding to the one or more uplink resources allocated for at least the portion of the payload data and the different data.

Aspect 31: The method of any one of aspects 23 through 30, further comprising: receiving a repetition indicator from the distributed unit, wherein the repetition indicator indicates a configuration of an uplink data channel with one or more repetitions for receiving the payload data; and receiving the payload data and one or more repetitions of the payload data in response to receiving the repetition indicator.

Aspect 32: The method of any one of aspects 23 through 31, wherein the payload data is a physical uplink shared channel (PUSCH) data.

Aspect 33: The method of any one of aspects 23 through 32, further comprising: receiving a message A comprising the preamble and the payload data that includes a physical uplink shared channel (PUSCH) data, the message A being the message; and transmitting a message B comprising a random access response and a contention resolution message, wherein the two-step random access procedure includes the message A and the message B.

Aspect 34: The method of any one of aspects 23 through 33, wherein the receiving the static configuration information from the distributed unit comprises receiving the static configuration information from the distributed unit via a management plane (M-plane) message.

Aspect 35: The method of any one of aspects 23 through 34, further comprising: transmitting a direct current (DC) subcarrier location to the distributed unit, the DC subcarrier location indicating a location of a DC subcarrier used to communicate with a user equipment (UE); receiving downlink data that carries a system information block including the DC subcarrier location from the distributed unit; and transmitting the downlink data to the UE.

Aspect 36: The method of aspect 35, wherein the transmitting the DC subcarrier location to the distributed unit comprises transmitting the DC subcarrier location to the distributed unit via a management plane (M-plane) message.

Aspect 37: The method of any one of aspects 23 through 36, further comprising: receiving a static configuration stop indicator from the distributed unit, the static configuration stop indicator indicating for the radio unit to stop a static configuration of the radio unit based on the static configuration information; and refraining from statically configuring the radio unit based on the static configuration information in response to the static configuration stop indicator.

Aspect 38: The method of aspect 37, further comprising: receiving the payload data based on a dynamic configuration for receiving the payload data in response to the static configuration stop indicator.

Aspect 39: The method of aspect 37 or 38, wherein the static configuration stop indicator includes a stop duration during which the radio unit is to stop statically configuring the radio unit based on the static configuration information, and wherein the refraining from statically configuring the radio unit based on the static configuration comprises refraining from statically configuring the radio unit based on the static configuration for the stop duration.

Aspect 40: The method of any one of aspects 37 through 39, wherein the static configuration stop indicator is received from the distributed unit via a control plane (C-plane) message.

Aspect 41: The method of any one of aspects 23 through 40, further comprising: receiving a static configuration start indicator from the distributed unit, the static configuration start indicator indicating for the radio unit to start a static configuration of the radio unit based on the static configuration information; and configuring the radio unit based on the static configuration information for receiving the payload data in response to the static configuration start indicator.

Aspect 42: The method of aspect 41, wherein the static configuration start indicator includes a static duration during which the radio unit is to statically configure the radio unit based on the static configuration information, and wherein the configuring the radio unit based on the static configuration information for receiving the payload data comprises configuring the radio unit based on the static configuration information for receiving the payload data for the static duration.

Aspect 43: The method of aspect 41 or 42, wherein the static configuration start indicator is received from the distributed unit via a control plane (C-plane) message.

Aspect 44: A radio unit comprising: a transceiver configured to communicate with a radio access network, a memory, and a processor communicatively coupled to the transceiver and the memory, wherein the processor is configured to perform any one of aspects 23 through 43.

Aspect 45: A radio unit configured for wireless communication comprising at least one means for performing any one of aspects 23 through 43.

Aspect 46: A non-transitory processor-readable storage medium having instructions for a radio unit thereon, wherein the instructions, when executed by a processing circuit, cause the processing circuit to perform any one of aspects 23 through 43.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-20 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-20 may be configured to perform one or more of the methods, features, or steps described herein.

The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A distributed unit for wireless communication in a network node, comprising:
   at least one processor;
   a transceiver coupled to the at least one processor; and
   a memory coupled to the at least one processor,
   wherein the at least one processor is configured to:
      receive, from a radio unit, a static configuration support indication for receiving payload data via a message in a two-step random access procedure, the message including a preamble and the payload data; and
      transmit, in response to receiving the static configuration support indication, static configuration information to the radio unit, the static configuration information for receiving the payload data communicated via the message.

2. The distributed unit of claim 1, wherein the static configuration information for receiving the payload data includes at least one of:
   a frequency domain configuration for receiving the payload data,
   a time domain configuration for receiving the payload data, or
   a reference signal configuration.

3. The distributed unit of claim 2, wherein the frequency domain configuration includes at least one of:
   a number of frequency-multiplexed physical uplink shared channel (PUSCH) occasions available per time instance,
   a number of resource blocks by which consecutive PUSCH occasions in a frequency domain are separated,
   an offset value with respect to a physical resource block (PRB) number zero or a virtual resource block (VRB) number zero, the offset value indicating a starting PRB of a PUSCH occasion or a starting VRB of the PUSCH occasion,
   a number of PRBs per PUSCH occasion, or
   an indication indicating whether to perform frequency hopping for transmission of the message along with a hopping offset.

4. The distributed unit of claim 2, wherein the time domain configuration includes at least one of:
   a number of slots containing one or more physical uplink shared channel (PUSCH) occasions with a same time domain allocation,
   a guard period by which consecutive PUSCH occasions in a time domain are separated,
   a number of contiguous time domain PUSCH occasions in each slot including the guard period,
   a parameter indicating a start symbol and a length corresponding to a number of consecutive symbols allocated for receiving the payload data via the message, and a PUSCH mapping type for receiving the payload data via the message,
   a parameter indicating the start symbol and the length corresponding to the number of consecutive symbols allocated for receiving the payload data via the message, and a reference signal mapping type, or
   a time offset between a start of each physical random access channel (PRACH) slot and a first PUSCH occasion slot.

5. The distributed unit of claim 2, wherein the reference signal configuration includes a demodulation reference signal (DMRS) configuration including at least one of:
   a position for each DMRS symbol in a slot,
   an indicator indicating one or more DMRS resource elements in a resource block for a DMRS symbol, or
   a bit indicating whether one or more non-DMRS resource elements within a DMRS symbol are occupied by the payload data or not.

6. The distributed unit of claim 1, wherein the at least one processor is further configured to:
   transmit a resource overlap indicator to the radio unit, wherein the resource overlap indicator indicates one or more uplink resources allocated for at least a portion of the payload data and for a different data, different from the payload data.

7. The distributed unit of claim 6, wherein the at least one processor is further configured to:
   transmit an enable indicator to the radio unit, wherein the enable indicator indicates whether to transmit quadrature data corresponding to the one or more uplink resources to the distributed unit based on the resource overlap indicator.

8. The distributed unit of claim 1, wherein the at least one processor is further configured to:
   transmit a repetition indicator to the radio unit, wherein the repetition indicator indicates a configuration of an uplink data channel with one or more repetitions for receiving the payload data.

9. The distributed unit of claim 1, wherein the payload data is a physical uplink shared channel (PUSCH) data.

10. The distributed unit of claim 1, wherein the two-step random access procedure comprises use of:

a message A comprising the preamble and the payload data that includes a physical uplink shared channel (PUSCH) data, the message A being the message, and a message B comprising a random access response and a contention resolution message.

11. The distributed unit of claim 1, wherein the at least one processor configured to transmit the static configuration information to the radio unit is configured to transmit the static configuration information to the radio unit via a management plane (M-plane) message.

12. The distributed unit of claim 1, wherein the at least one processor is further configured to:

receive a direct current (DC) subcarrier location from the radio unit, the DC subcarrier location indicating a location of a DC subcarrier used to communicate with a user equipment (UE);

schedule a downlink transmission of downlink data that carries a system information block including the DC subcarrier location; and transmit the downlink data to the radio unit.

13. The distributed unit of claim 12, wherein the at least one processor configured to receive the DC subcarrier location from the radio unit is configured to receive the DC subcarrier location from the radio unit via a management plane (M-plane) message.

14. The distributed unit of claim 1, wherein the at least one processor is configured to perform at least one of:

transmit a static configuration stop indicator to the radio unit, the static configuration stop indicator indicating for the radio unit to stop a static configuration of the radio unit based on the static configuration information, or transmit a static configuration start indicator to the radio unit, the static configuration start indicator indicating for the radio unit to start a static configuration of the radio unit based on the static configuration information.

15. A method of configuring wireless communication by a distributed unit in a network node, comprising:

receiving, from a radio unit, a static configuration support indication for receiving payload data via a message in a two-step random access procedure, the message including a preamble and the payload data; and transmitting, in response to receiving the static configuration support indication, static configuration information to the radio unit, the static configuration information for receiving the payload data communicated via the message.

16. A radio unit for wireless communication, comprising:
at least one processor;
a transceiver coupled to the at least one processor; and
a memory coupled to the at least one processor,
wherein the at least one processor is configured to:
transmit, to a distributed unit, a static configuration support indication for receiving payload data via a message in a two-step random access procedure, the message including a preamble and the payload data; and
receive, in response to the static configuration support indication, static configuration information from the distributed unit, the static configuration information for receiving the payload data communicated via the message.

17. The radio unit of claim 16, wherein the at least one processor is further configured to:
determine whether to configure the radio unit based on the static configuration information; and receive the payload data based on the static configuration information in response to determining to configure the radio unit based on the static configuration information.

18. The radio unit of claim 16, wherein the static configuration information for receiving the payload data includes at least one of:

a frequency domain configuration for receiving the payload data, a time domain configuration for receiving the payload data, or a reference signal configuration.

19. The radio unit of claim 18, wherein the frequency domain configuration includes at least one of:

a number of frequency-multiplexed physical uplink shared channel (PUSCH) occasions available per time instance, a number of resource blocks by which consecutive PUSCH occasions in a frequency domain are separated, an offset value with respect to a physical resource block (PRB) number zero or a virtual resource block (VRB) number zero, the offset value indicating a starting PRB of a PUSCH occasion or a starting VRB of the PUSCH occasion, a number of PRBs per PUSCH occasion, or an indication indicating whether to perform frequency hopping for transmission of the message along with a hopping offset.

20. The radio unit of claim 18, wherein the time domain configuration includes at least one of:

a number of slots containing one or more physical uplink shared channel (PUSCH) occasions with a same time domain allocation, a guard period by which consecutive PUSCH occasions in a time domain are separated, a number of contiguous time domain PUSCH occasions in each slot including the guard period, a parameter indicating a start symbol and a length corresponding to a number of consecutive symbols allocated for receiving the payload data via the message, and a PUSCH mapping type for receiving the payload data via the message, a parameter indicating the start symbol and the length corresponding to the number of consecutive symbols allocated for receiving the payload data via the message, and a reference signal mapping type, or a time offset between a start of each physical random access channel (PRACH) slot and a first PUSCH occasion slot.

21. The radio unit of claim 18, wherein the reference signal configuration includes a demodulation reference signal (DMRS) configuration including at least one of:

a position for each DMRS symbol in a slot, an indicator indicating one or more DMRS resource elements in a resource block for the DMRS symbol, or a bit indicating whether one or more non-DMRS resource elements within a DMRS symbol are occupied by the payload data or not.

22. The radio unit of claim 16, wherein the at least one processor is further configured to:

receive a resource overlap indicator from the distributed unit, wherein the resource overlap indicator indicates one or more uplink resources allocated for at least a portion of the payload data and for a different data, different from the payload data; and refrain from transmitting, to the distributed unit, quadrature data corresponding to the one or more uplink resources.

23. The radio unit of claim 22:
wherein the at least one processor is further configured to receive, from the distributed unit, an enable indicator that indicates whether to transmit the quadrature data corresponding to the one or more uplink resources to the distributed unit based on the resource overlap indicator; and
wherein the at least one processor configured to refrain from transmitting the quadrature data corresponding to the one or more uplink resources is configured to refrain from transmitting the quadrature data corresponding to the one or more uplink resources in response to receiving the enable indicator indicating not to transmit the quadrature data corresponding to the one or more uplink resources allocated for at least the portion of the payload data and the different data.

24. The radio unit of claim 16, wherein the at least one processor is further configured to:
receive a repetition indicator from the distributed unit, wherein the repetition indicator indicates a configuration of an uplink data channel with one or more repetitions for receiving the payload data; and
receive the payload data and one or more repetitions of the payload data in response to receiving the repetition indicator.

25. The radio unit of claim 16, wherein the payload data is a physical uplink shared channel (PUSCH) data.

26. The radio unit of claim 16, wherein the at least one processor is further configured to:
receive a message A comprising the preamble and the payload data that includes a physical uplink shared channel (PUSCH) data, the message A being the message; and
transmit a message B comprising a random access response and a contention resolution message, wherein the two-step random access procedure includes the message A and the message B.

27. The radio unit of claim 16, wherein the at least one processor configured to receive the static configuration information from the distributed unit is configured to receive the static configuration information from the distributed unit via a management plane (M-plane) message.

28. The radio unit of claim 16, wherein the at least one processor is further configured to:
transmit a direct current (DC) subcarrier location to the distributed unit, the DC subcarrier location indicating a location of a DC subcarrier used to communicate with a user equipment (UE);
receive downlink data that carries a system information block including the DC subcarrier location from the distributed unit; and
transmit the downlink data to the UE.

29. The radio unit of claim 28, wherein the at least one processor configured to transmit the DC subcarrier location to the distributed unit is configured to transmit the DC subcarrier location to the distributed unit via a management plane (M-plane) message.

30. A method of configuring a wireless communication by a radio unit, comprising:
transmitting, to a distributed unit, a static configuration support indication for receiving payload data via a message in a two-step random access procedure, the message including a preamble and the payload data; and
receiving, in response to the static configuration support indication, static configuration information from the distributed unit, the static configuration information for receiving the payload data communicated via the message.

* * * * *